(12) United States Patent
Manly

(10) Patent No.: US 10,247,520 B2
(45) Date of Patent: Apr. 2, 2019

(54) TACTICAL ACCESSORY ATTACHMENT SYSTEM

(71) Applicant: Joseph A. Manly, Chelsea, MI (US)

(72) Inventor: Joseph A. Manly, Chelsea, MI (US)

( * ) Notice: Subject to any disclaimer, the term of this patent is extended or adjusted under 35 U.S.C. 154(b) by 553 days.

(21) Appl. No.: 14/936,345

(22) Filed: Nov. 9, 2015

(65) Prior Publication Data

US 2016/0097614 A1   Apr. 7, 2016

Related U.S. Application Data

(63) Continuation-in-part of application No. PCT/US2014/037239, filed on May 8, 2014.

(60) Provisional application No. 62/097,175, filed on Dec. 29, 2014, provisional application No. 61/899,168, filed on Nov. 2, 2013, provisional application No. 61/826,681, filed on May 23, 2013, provisional application No. 61/822,622, filed on May 13, 2013.

(51) Int. Cl.
| | | |
|---|---|---|
| *F41G 11/00* | (2006.01) | |
| *F41C 23/16* | (2006.01) | |
| *F41C 27/18* | (2006.01) | |
| *F41C 33/04* | (2006.01) | |
| *F16B 21/18* | (2006.01) | |

(52) U.S. Cl.
CPC .......... *F41G 11/001* (2013.01); *F16B 21/186* (2013.01); *F41C 23/16* (2013.01); *F41C 27/18* (2013.01); *F41C 33/041* (2013.01); *Y10T 403/591* (2015.01); *Y10T 403/599* (2015.01); *Y10T 403/602* (2015.01)

(58) Field of Classification Search
CPC ...... F16B 7/042; F16B 21/065; F16B 21/073; F16B 21/16; F16B 21/18; F16B 21/186; F41C 23/16; F41C 27/18; F41C 33/041; F41G 11/001; F41G 11/003; Y10T 403/32483; Y10T 403/32516; Y10T 403/59; Y10T 403/591; Y10T 403/593; Y10T 403/599–403/602; Y10T 403/7015; Y10T 403/7073–403/7077
USPC ............ 403/109.3, 109.7, 321, 322.1, 322.3, 403/325–327, 353, 375–377, DIG. 4
See application file for complete search history.

(56) References Cited

U.S. PATENT DOCUMENTS

| | | |
|---|---|---|
| 545,528 A | 9/1895 | Paul |
| 1,023,741 A | 4/1912 | Kreith |
| D47,748 S | 8/1915 | Donas |
| 1,214,834 A | 2/1917 | Scubelek |
| 1,229,721 A | 6/1917 | Cooke |
| 1,231,058 A | 6/1917 | Pansa |
| 1,238,820 A | 9/1917 | Pys |
| 1,239,065 A | 9/1917 | Wigiert |

(Continued)

*Primary Examiner* — Josh Skroupa
(74) *Attorney, Agent, or Firm* — Endurance Law Group PLC

(57) ABSTRACT

A quick attachment coupling system to attach tactical or tool accessories, providing the ability to interchange accessories on the fly, which can be modified to fit or be integrated to the magazine base of a pistol, the fore-end of a long gun, the exterior of wearable tactical gear, or any other supporting structure. The coupling system includes a dock. Each accessory tool is fitted with a tang which slides into a tang slot in the dock where it is automatically secured for use by a spring-loaded lock switch. A core plug in the tang slot holds the lock switch in an unlocked position when the accessory tool is uncoupled from the dock.

17 Claims, 14 Drawing Sheets

(56) References Cited

U.S. PATENT DOCUMENTS

| | | | | |
|---|---|---|---|---|
| 1,384,644 | A | 7/1921 | Stuller | |
| 1,474,292 | A | 11/1923 | Renard | |
| 2,098,139 | A | 11/1937 | Foley et al. | |
| 2,467,270 | A | 4/1949 | Patchett | |
| 2,729,495 | A * | 1/1956 | Dejean | B64D 17/383 403/321 |
| 2,805,507 | A | 9/1957 | Buquor | |
| 3,900,950 | A | 8/1975 | Collins | |
| 4,169,312 | A | 10/1979 | Mar | |
| 4,233,737 | A | 11/1980 | Poehlmann | |
| 4,311,328 | A * | 1/1982 | Truchet | F16L 37/22 285/308 |
| 4,483,510 | A * | 11/1984 | Palau | F16L 37/0841 137/596 |
| 4,592,160 | A | 6/1986 | Bross | |
| 5,452,736 | A * | 9/1995 | Arosio | F16L 37/413 137/614.03 |
| 5,577,859 | A * | 11/1996 | Nau | F16D 1/116 403/325 |
| 5,820,291 | A * | 10/1998 | Lutz | F16D 1/116 403/325 |
| 6,779,778 | B2 * | 8/2004 | Kuwabara | F16L 37/23 251/149.9 |
| 6,913,413 | B2 * | 7/2005 | Yang | F16B 21/065 403/321 |
| 6,968,642 | B1 | 11/2005 | Leung | |
| 7,146,762 | B1 | 12/2006 | Leung | |
| 7,472,930 | B2 * | 1/2009 | Tiberghien | F16L 37/0841 285/308 |
| 7,637,049 | B1 | 12/2009 | Samson et al. | |
| 7,937,871 | B2 | 5/2011 | Mantas | |
| 8,191,267 | B2 * | 6/2012 | Patel | B25G 3/18 30/339 |
| 8,196,328 | B2 | 6/2012 | Simpkins | |
| 8,245,428 | B2 * | 8/2012 | Griffin | F41C 23/16 42/72 |
| 8,256,803 | B2 * | 9/2012 | Takahashi | F16L 37/34 285/276 |
| 8,469,406 | B2 * | 6/2013 | Takahashi | F16L 37/23 137/614.05 |
| 8,500,358 | B1 * | 8/2013 | Cassidy | A63B 21/156 403/325 |
| 8,707,841 | B2 * | 4/2014 | Morehead | B21D 28/34 83/686 |
| 9,234,722 | B2 * | 1/2016 | Rice | F41C 27/16 |
| 9,511,213 | B2 * | 12/2016 | Doll | A61M 39/00 |
| 2009/0038199 | A1 | 2/2009 | Oz | |
| 2009/0133451 | A1 * | 5/2009 | Standar | F16B 21/16 70/174 |
| 2013/0177350 | A1 * | 7/2013 | Guihard | F16B 17/00 403/322.1 |

* cited by examiner

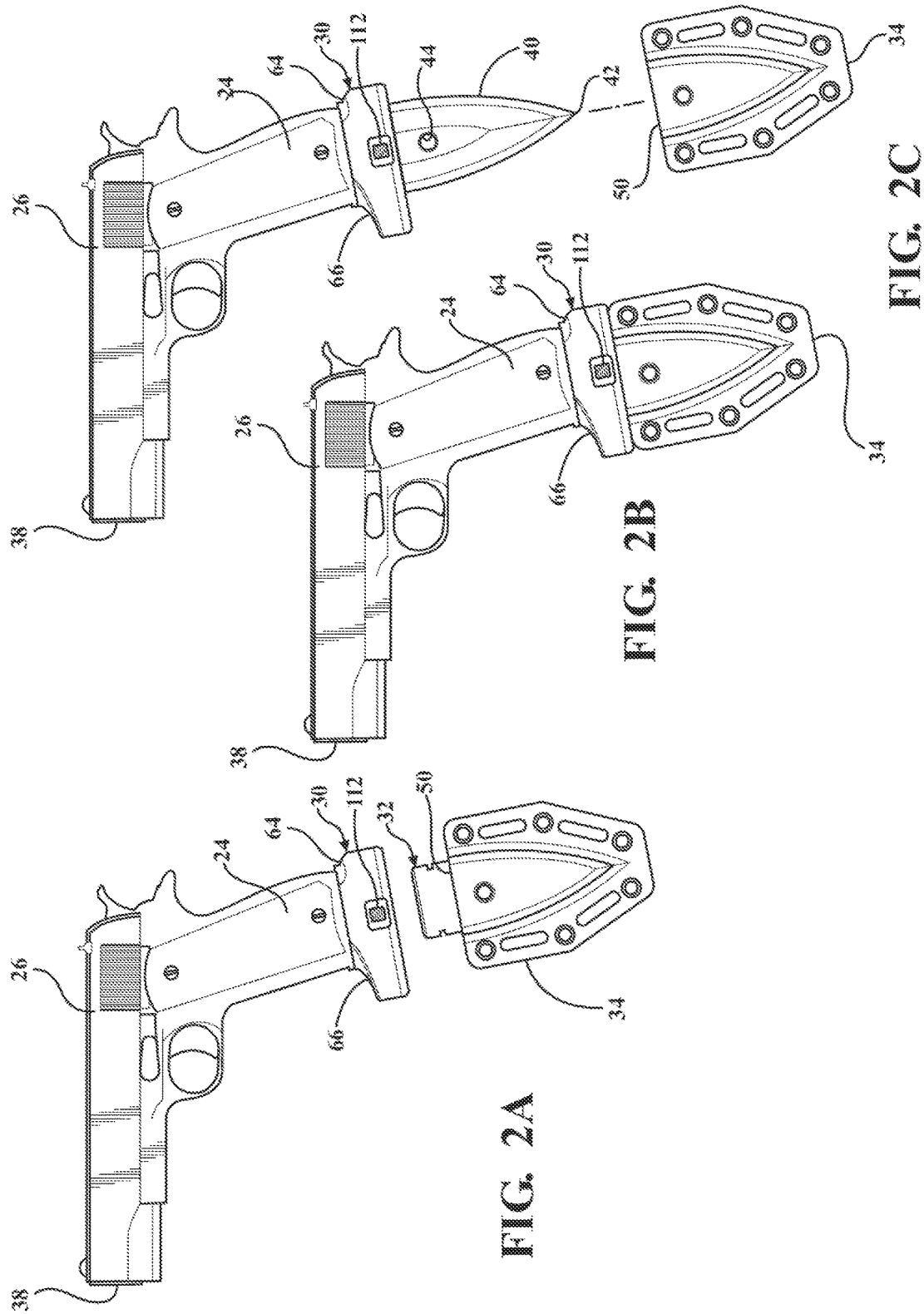

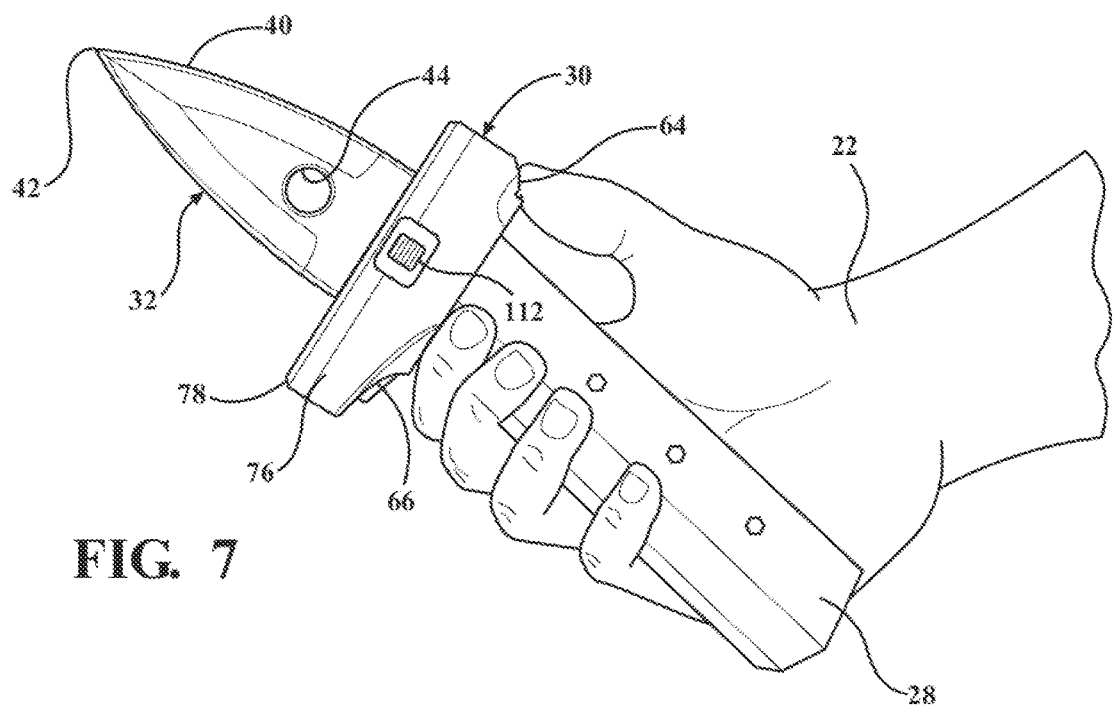
FIG. 7
FIG. 8
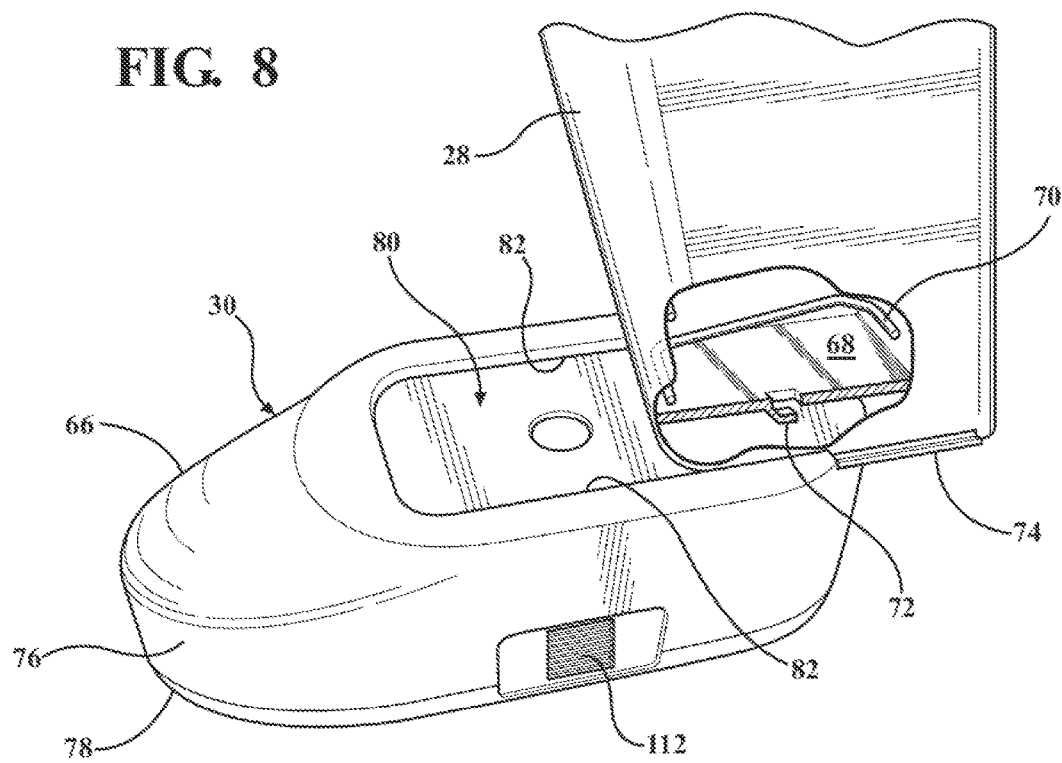

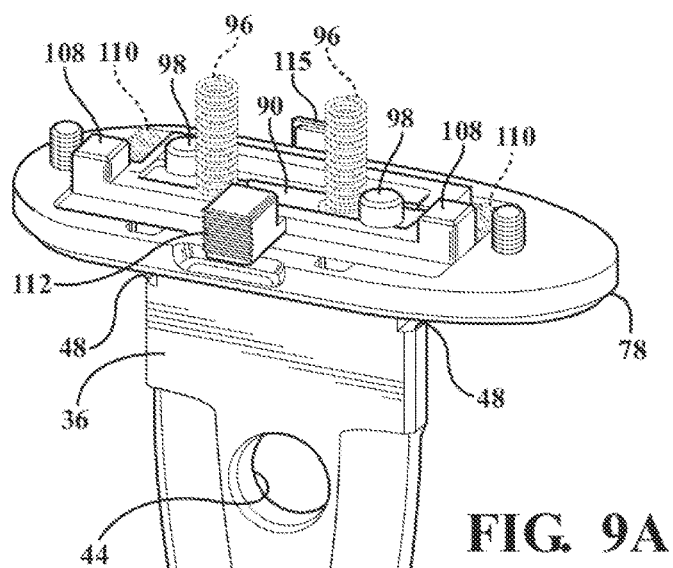
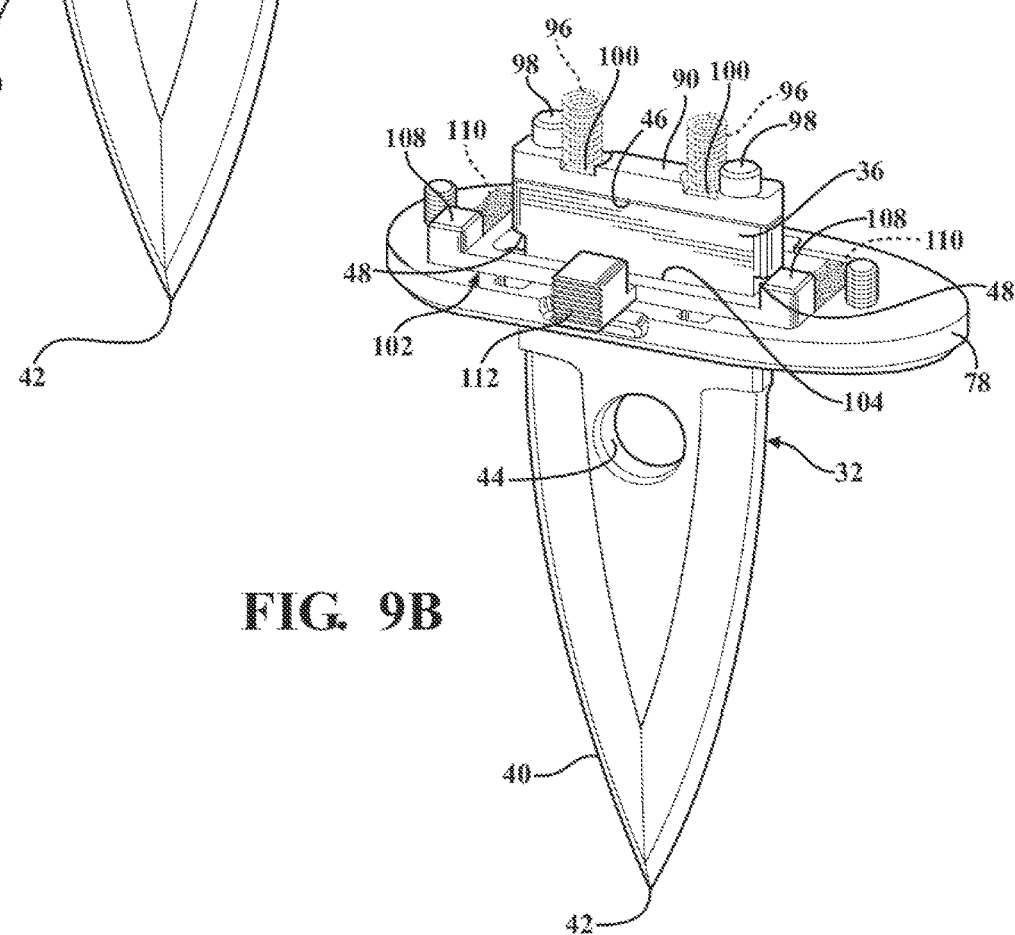

TACTICAL ACCESSORY ATTACHMENT SYSTEM

CROSS REFERENCE TO RELATED APPLICATIONS

This application is a Continuation-In-Part of International Patent Application No. PCT/US14/37239 filed May 8, 2014, which claims priority to Provisional Patent Application No. 61/822,622 filed May 13, 2013, and also claims priority to Provisional Patent Application No. 61/826,681 filed May 23, 2013, and also claims priority to Provisional Patent Application No. 61/899,168 filed Nov. 2, 2013. This application also claims priority to Provisional Patent Application No. 62/097,175 filed Dec. 29, 2014.

BACKGROUND OF THE INVENTION

Field of the Invention

The invention relates generally to a device for quickly coupling a tactical tool to a supporting structure.

Description of Related Art

Close Quarters Combat (CQC) is a type of warfare in which a person engages the enemy at very short range, usually up to 30 meters. CQC can include proximity hand-to-hand combat, bladed weapons fighting, as well as target negotiation with short range firearms. CQC is high-intensity conflict, characterized by sudden deadly violence at close range.

Traditionally, a bayonet is a knife, sword, or spike-shaped weapon designed to fit in, on, over or underneath the muzzle of a rifle, musket or similar weapon, effectively turning the firearm into a spear. The bayonet is generally considered an ancillary, CQC or last-resort weapon. Detachable knife-like bayonets may be used as a general purpose cutting implement when not fixed to a gun barrel. There have been examples of a bayonet attached to the muzzle of a pistol/handgun, such as U.S. Pat. No. 1,214,834 to Scubelek issued Feb. 6, 1917, U.S. Pat. No. 2,467,270 to Patchett issued Apr. 12, 1949, and U.S. Pat. No. 2,805,507 to Buquor issued Sep. 10, 1957. While there may be an aesthetic attraction placing a bladed weapon at the end of a pistol/handgun barrel, this application is generally considered ineffective and unrealistic in most CQC situations due to the limited range of attack motion. In knife fighting, the forward thrust of a bladed weapon at the end of a pistol/handgun barrel is considered by many experts not to be a fully natural or effective motion, and therefore not truly advantageous in a genuine CQC situation. Accordingly, bayonets attached to the fore end of a pistol/handgun have proven unpopular among the military and tactical law enforcement community.

The prior art has proposed other configurations combining a bladed weapon and/or bayonet with a handgun. These can be generally categorized as blades that extend upward from the barrel and blades that extend downward from the handgrip. Examples of blades that extend upward from the barrel of a handgun may be seen in U.S. Pat. No. 1,238,820 to Pys issued Sep. 4, 1917, and U.S. Pat. No. 1,384,644 to Stuller issued Jul. 12, 1921. Examples of blades that extend downward from the handgrip of a handgun may be seen in U.S. Pat. No. 545,528 to Paul issued Sep. 3, 1895, U.S. Pat. No. 1,023,741 to Kreith issued Apr. 16, 1912, 1,229,721 to Cooke issued Jun. 12, 1917, U.S. Pat. No. 1,231,058 to Pansa issued Jun. 26, 1917 and U.S. Pat. No. 1,474,292 to Renard issued Nov. 13, 1923.

Bladed weapons that extend upwardly from the barrel of the handgun, much like those attached at the end of a handgun barrel, are widely considered ineffective and unrealistic in CQC situations. However, blades that extend downward from the handgrip of a handgun can, under the proper circumstances, be ergonomically arranged for an orientation very closely approximating a reverse knife grip known to knife fighting experts. The reverse knife grip technique occurs when the knife blade and point are distant from the user's thumb; i.e., the little finger is closest to the cutting edge. A reverse knife grip is sometimes referred to as a slash attack grip or an icepick grip or stabbing grip. Advantages of a reverse knife grip technique include: the blade cutting edge faces the enemy even when guarding with the forearm, the cutting edge can be raked across the enemy in a slashing motion after a cross punch, easier access to enemies located behind the user (i.e., posterior), tremendous force can be brought to bear on the point, the grip produces an exceptionally secure hold, and the natural "elbows bent" position enables the user to maintain a more powerful and defensive fighting stance for hand-to-hand combat.

In CQC situations, it is desirable to have a lightweight, easily accessible "get the heck off me" knife that can be held or accessed quickly in time of specific danger. This may be in a situation where more than one assailant or combatant is engaged, especially when enemies are located in front and rear or side. However, in times of non-danger the knife blade must not pose a risk or impediment to the user. Several of the prior art examples mentioned above configure the knife blade on a pivot to rotate between stowed (non-use) and extended (use) positions. In these examples, the ability of a user to quickly deploy the blade in time of surprise is severely compromised. Furthermore, in several cases the stowed blades perpetually expose a cutting edge that poses a danger to the user. Other prior art examples utilize fully detachable blades that are cumbersome to connect in times of intense action. Still further examples of the prior art are designed with blades hidden inside the handgrip and spring-activated to thrust out into a fully extended (deployed) position. Problems with these latter types of a blades include accidental deployment of the blade, and the space requirements to locate a sheath inside the handgrip—thus effectively precluding use of this design in semi-automatic handguns fed from a magazine in the handgrip.

It is known to modify the base plate of a pistol ammunition magazine to enhance the grip and/or to increase the magazine capacity. It is also known to permanently affix a stubby point to the end of a magazine for use as a glass-breaker. See for example U.S. Pat. No. 7,937,871 to Mantas issued May 10, 2011. Nevertheless, the known examples of prior art magazine base plate modifications are of limited use, single-purpose designs that do not enable use of a detachable bayonet or other useful implements in a manner suitable for CQC applications.

Accordingly, there exists a need to effectively accommodate blades and other types of implements on the pistol grip of a handgun in a convenient, ergonomic manner and which can be rapidly deployed in instances of sudden, extreme life-threatening action. Moreover, there exists a need to quickly and securely couple accessory tools of all types to a supporting structure using a straight-line coupling motion. Additionally, there is a need to create a quick-change coupling system in which an accessory tool, such as a flashlight for example, can be locked to a person quickly under high stress situations and just as quickly removed or relocated. The coupling system should minimize the need to carry redundant accessory items, which can thereby reduce overall weight, and provide the opportunity to add or remove items on the fly, safely in high stress scenarios such as combat, such as to a duty or standard belt, tactical vest, or even to a military/law enforcement tactical helmet.

BRIEF SUMMARY OF THE INVENTION

According to one aspect of this invention, a coupling assembly is provided of the type for rapidly connecting and disconnecting an accessory tool to a support structure through a straight-line motion. The assembly comprises a dock having a tang slot. A core plug is slidably disposed in the tang slot. The core plug has a nose end. The tang slot is configured to receive at least a portion of the nose end of the core plug. At least one core spring is operatively disposed in bias against the core plug. An accessory tool includes a tang that has a cross-section configured to fit matingly within the tang slot in the dock. A lock switch supported on the dock for selective movement between locked and unlocked positions. The lock switch engageable with the tang of the accessory tool in the locked position to hold the tang securely in the tang slot. And the lock switch disengageable from the tang of the accessory tool in the unlocked position to permit disconnection of the accessory tool from the dock.

According to another embodiment of the present invention, a fore-grip guard for a rifle is provided. The guard is fitted with an integrated dock accessed through a tang slot. A core plug slidably disposed inside the tang slot. The core plug has a nose end. The tang slot is configured to receive at least a portion of the nose end of the core plug. At least one core spring is operatively disposed in bias against the core plug. An accessory tool includes a tang that has a cross-section configured to fit within the tang slot in the dock. The tang has a top end. When the tang is disposed in the tang slot of the dock, the nose end of the core plug is in pressing engagement against the top end of the tang. A lock switch is supported for movement between locked and unlocked positions. The lock switch is engageable with the tang of the accessory tool when it is locked in the dock so as to hold the tang securely in the tang slot. The lock switch is disengageable from the tang of the accessory tool when it is in the unlocked position to permit disconnection of the accessory tool from the dock and from the fore-grip guard.

According to yet another embodiment of the present invention, a wearable piece of tactical equipment is provided. The wearable piece of tactical equipment comprises a dock having an exposed tang slot. A core plug is slidably disposed in the tang slot, and has a nose end. The tang slot is configured to receive at least a portion of the nose end of the core plug. At least one core spring is operatively disposed in bias against the core plug. An accessory tool includes a tang that has a cross-section configured to fit within the tang slot in the dock. The tang has a top end, and when the tang is fully engaged in the tang slot of the dock the nose end of the core plug disposed is pressing engagement against the top end of the tang. At least one notch is disposed in the tang. A lock switch is supported for movement between locked and unlocked positions. The lock switch has at least one bolt. The bolt is disposed in the notch of the tang when the lock switch is in the locked position. And the bolt is disengageable from the notch of the tang in the unlocked position to permit disconnection of the accessory tool from the dock.

In these various expressions, the coupling system of this invention enables rapid attachment of any of a number of tactical or tool accessories via a dock using a quick and simple straight-line motion. Moreover, the coupling system provides the ability to interchange accessory tools on the fly, which can be modified to fit or be integrated to the supporting structure for use of the accessory tool, which use may for example be a tactical situation, a police or fireman situation, a hunting or outdoor situation, a service-repair situation, or any other lawful purpose. In particular, a tang is incorporated directly onto the accessory tool or to the carrier/holster for an accessory tool. The tang then slides into the complimentary tang slot of the dock where it is automatically secured for use by a lock switch. A core plug in the tang slot holds the lock switch in an unlocked position when the tang is uncoupled from the dock.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIGS. 2A-2C also represent a time-action sequence showing a close-up side view of pistol fitted with a dock according to one embodiment of this invention and a knife blade being withdrawn from its sheath through motion of the pistol;

FIG. 7 shows a knife blade and dock attached to the base of an ammunition magazine that has been removed from a semi-automatic handgun and is being held by a user as a stand-alone knife in the traditional saber-type forward knife grip;

FIG. 8 is a fragmentary perspective view, in partial cross-section, of the lower end of an ammunition magazine as it is being attached to the top socket of a dock with a sliding motion;

FIGS. 9A and 9B are time-sequence perspective views showing the internal core plug and lock switch components of the dock as the knife blade is inserted into the tang slot and locked in position;

DETAILED DESCRIPTION OF THE INVENTION

Referring to the figures, wherein like numerals indicate like or corresponding parts throughout the several views, a coupling system for coupling a knife blade to the handgrip or ammunition magazine base of a pistol/handgun is shown in FIGS. 1-15. The coupling system is particularly adapted for use in surprise close quarter combat (CQC) and self-defense scenarios where a user holding a pistol either does not have time to release or does not wish to release their normal grip on the pistol while fitting the knife blade attachment. And just as importantly, the user does not wish to discontinue pointing the pistol muzzle in the general anterior direction toward an enemy while coupling the knife blade.

Figure 1A:
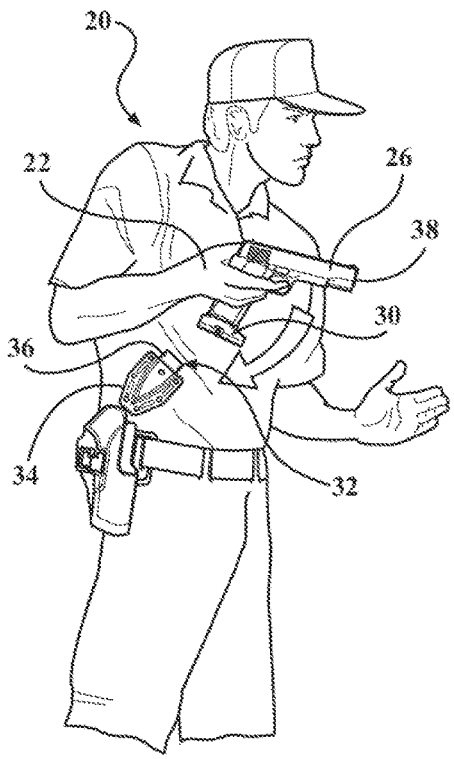
FIGS. 1A-1C represent a time-action sequence of a user holding pistol and in a smooth motion is able to attach and withdraw a knife blade from its sheath without taking eyes off an enemy or changing grip on the pistol.
Figure 1B:
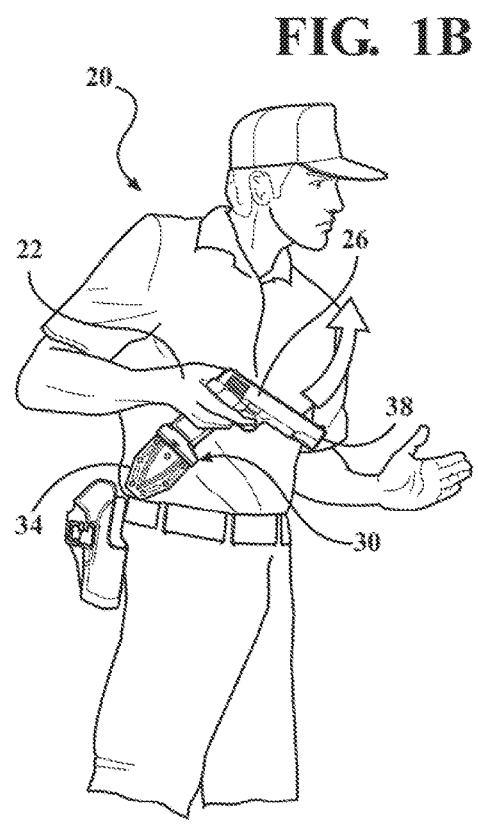
Figure 1C:
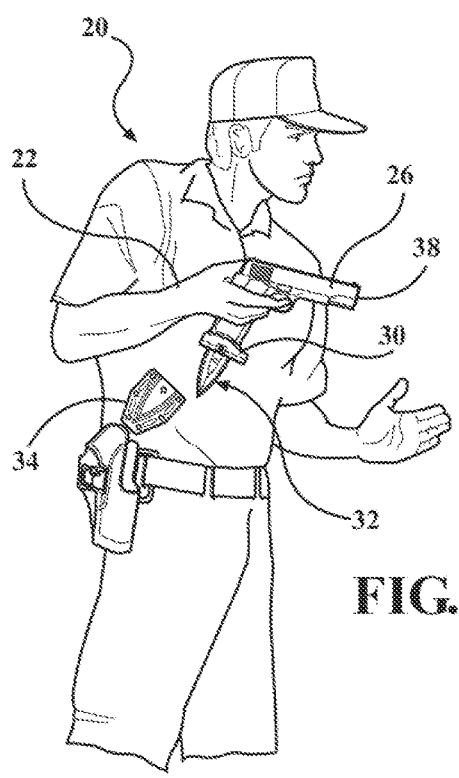
Figure 19:
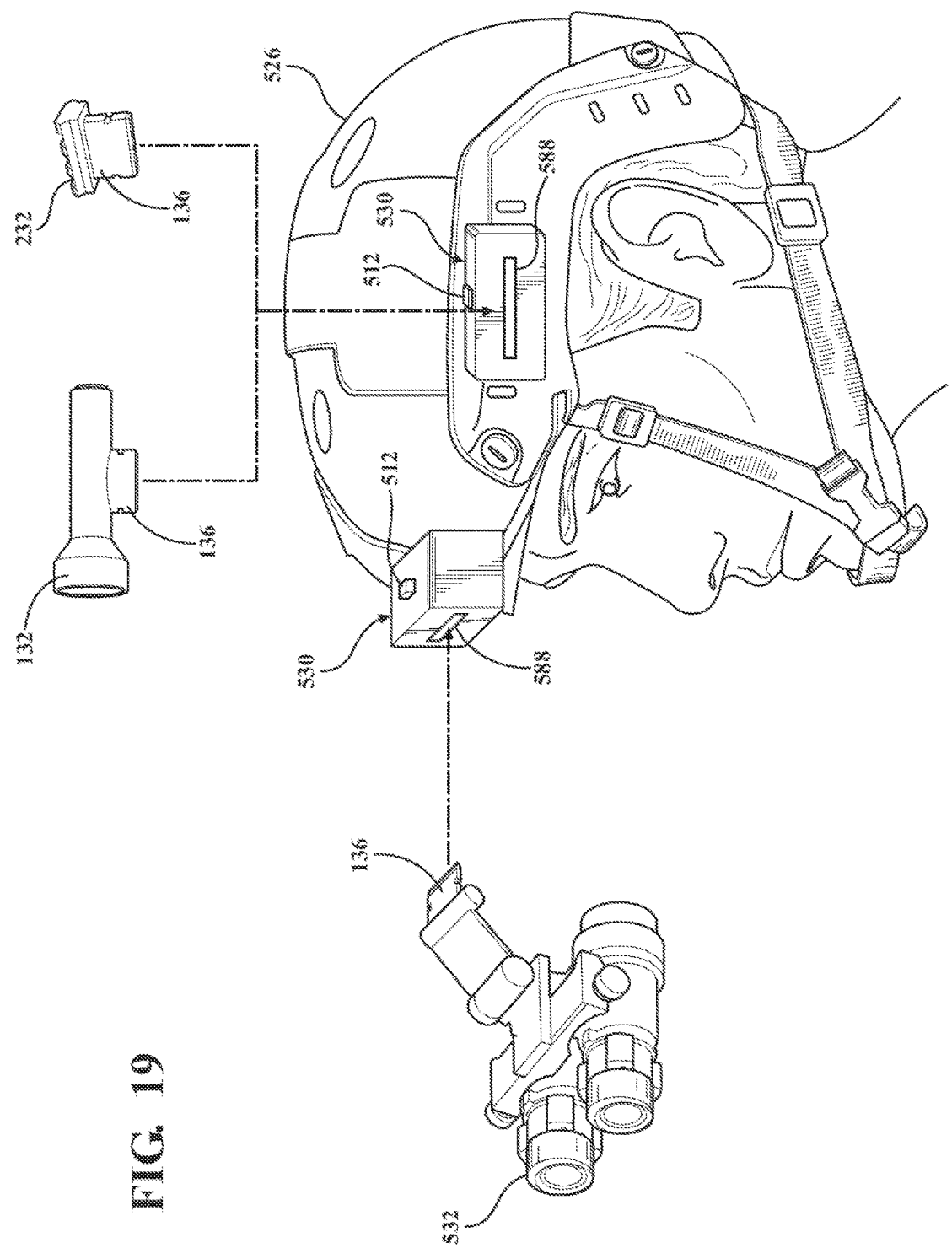
FIG. 19 is a still further embodiment of the present invention wherein the supporting structure for the dock is shown in the exemplary the form of a helmet, with various accessory items being selectively coupled and un-coupled thereto.
Figure 20:
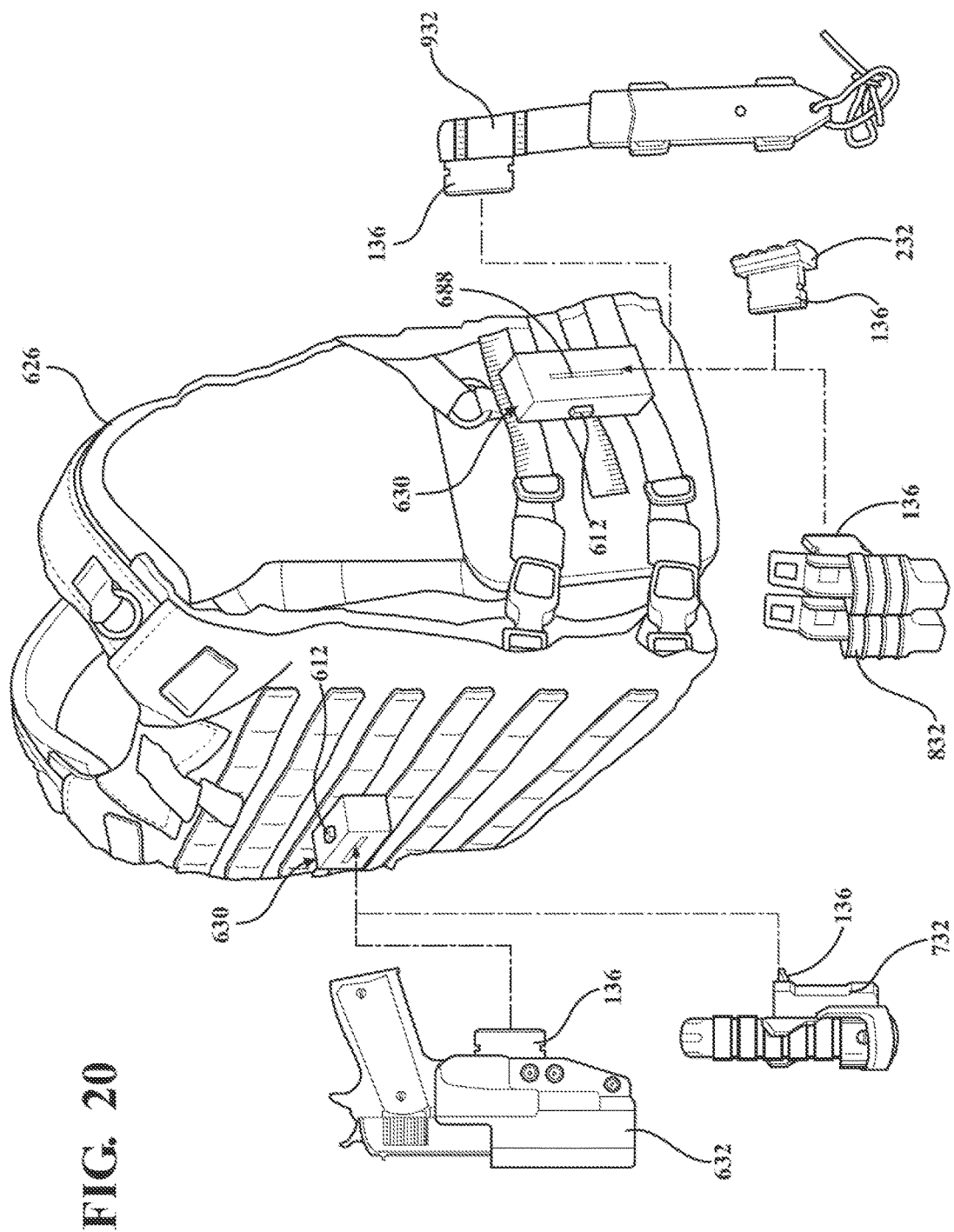
FIG. 20 is yet another alternative embodiment of the present invention wherein the supporting structure for the dock is shown in the exemplary the form of a MOLLE vest, with various accessory items being selectively coupled and un-coupled thereto.

This scenario is depicted in FIGS. 1A-1C, where the user is generally indicated at 20 with a presumed dominant hand 22 holding the handgrip 24 of a pistol 26. Preferably, but by no means necessarily, the pistol 26 is of the semi-automatic (or auto-loading) type fitted with an ammunition magazine 28 (see FIGS. 7 and 8) that in use is housed within an internal mag well in the handgrip 24. A dock, generally indicated at 30, is directly connected to the base of the handgrip 24 and serves as a pommel for the handgrip 24 when installed in the mag well. The dock 30 is adapted to be attached to a supporting structure. The supporting structure can be any suitable object. In one embodiment, the supporting structure comprises the lower end of the pistol magazine 28, as described in connection with FIGS. 1-16. In alternative embodiments, the dock 30 is attached to the fore end (or other regions) of a firearm (FIG. 18) or to articles of tactical gear such as a helmet (FIG. 19) or tactical vest (FIG. 20).

Returning to the first embodiment as shown in FIGS. 1-16, a knife blade, generally indicated at 32, is supported in a sheath 34 that is carried on the user 20. The knife blade 32 is provided with a specially configured tang 36 that is exposed above the sheath 34, as shown in FIGS. 1A and 2A. While holding the handgrip 24 of the pistol 26 in one hand 22, with a muzzle 38 continuing to point in an anterior (i.e., assailant-facing direction), the user 20 moves the pistol toward the knife blade 32 so that the dock 30 envelops its tang 36. This is illustrated in FIGS. 1B and 2C. The tang 36 automatically self-locks with the dock 30, so that as the user 20 lifts the pistol 26 away from the sheath 34 the knife blade 32 is withdrawn as shown in FIGS. 1C and 2C. Throughout this entire process, the muzzle 38 continues pointing in a direction facing the enemy which is a prime concern in CQC situations. Also, when the sheath 34 is ideally placed, the motion of the user's hand 22 requires only a short swinging or pumping action of the dominant arm relative to a normal defensive hold on the pistol 26.

Figure 3:
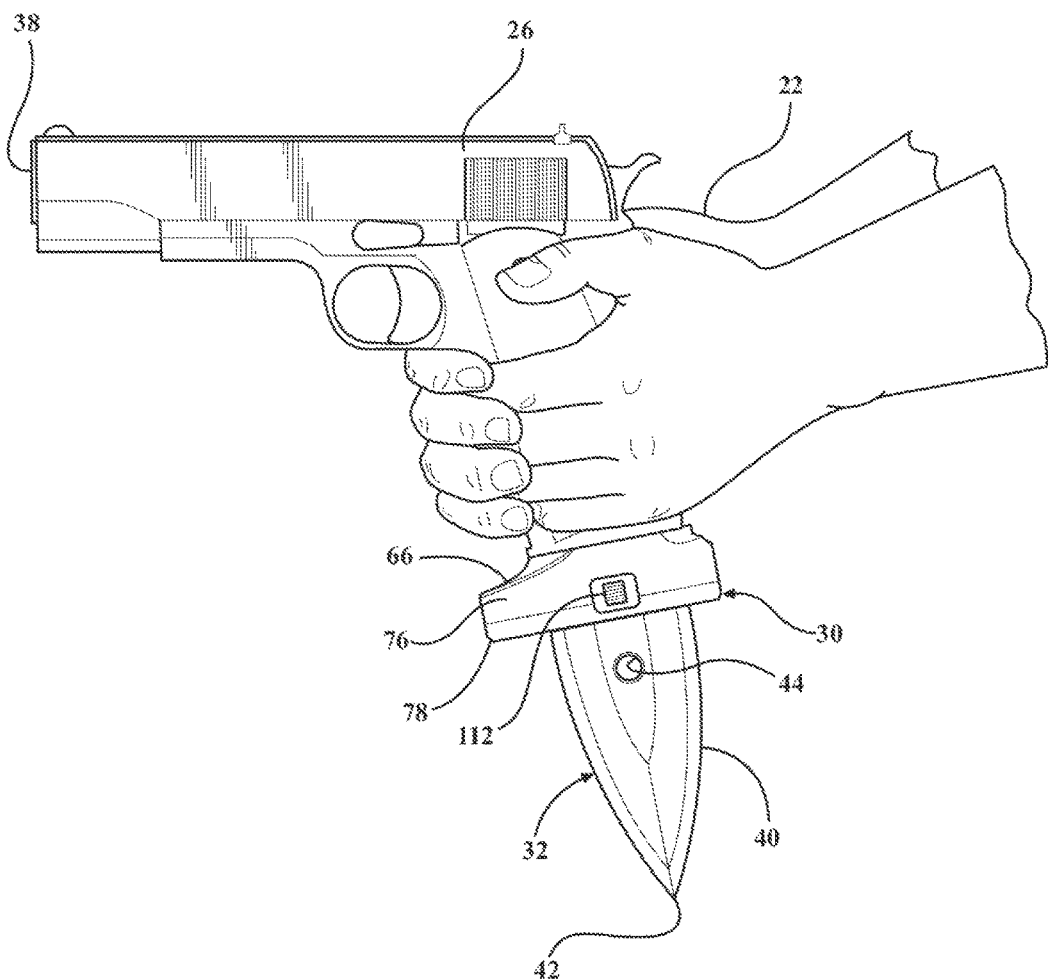
FIG. 3 is a side view showing a user holding a pistol with a two-hand grip, the pistol fitted with a dock and connected knife blade according to one embodiment of the present invention.

If, after coupling the knife blade 32, the user 20 deems it necessary to fire (or threaten firing) the pistol 26 at the enemy, the user 20 may instinctively assume a two-handed shooting grip. FIG. 3 is a close-up view showing that the connected knife blade 32 of this invention does not impede or in any way interfere with a standard two-handed shooting grip. Nor does the connected knife blade 32 pose a serious cutting risk to the user 20 when firing the pistol 26.

Figure 4:
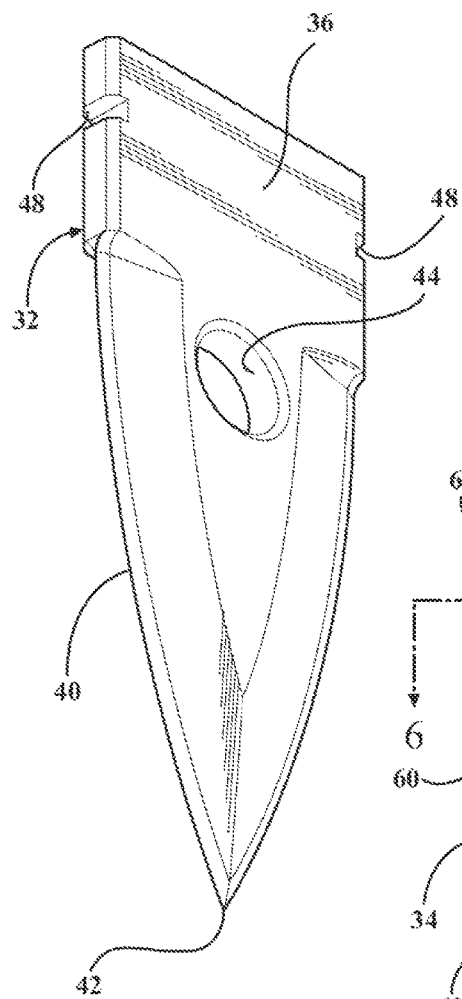
FIG. 4 is a perspective view of a knife blade according to one embodiment of the present invention.
Figure 5:
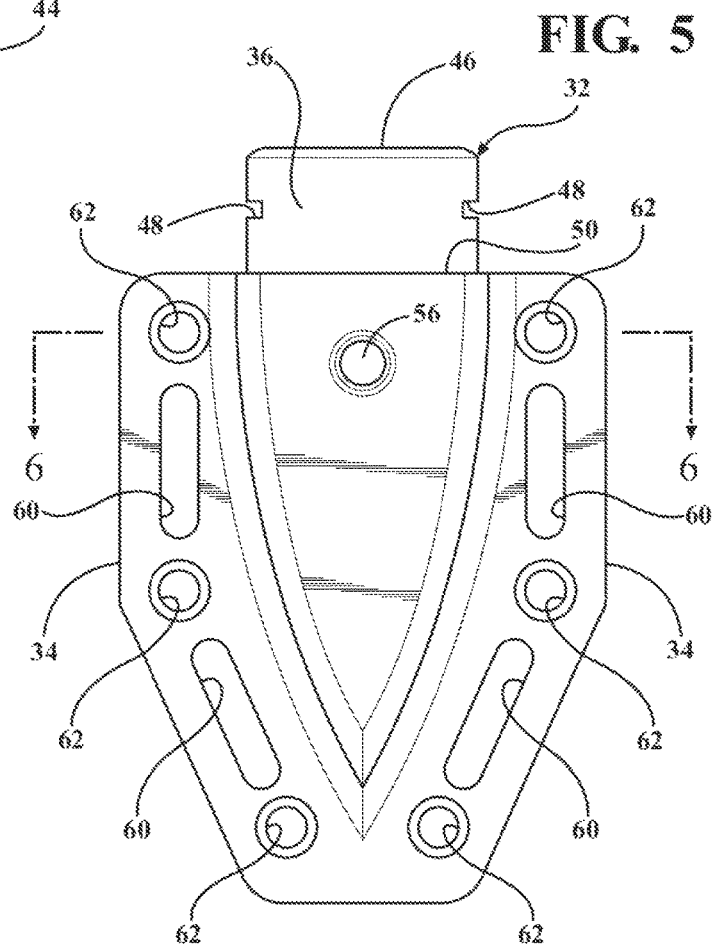
FIG. 5 is front view of a knife blade disposed in a sheath according to one embodiment of the present invention.
Figure 6:
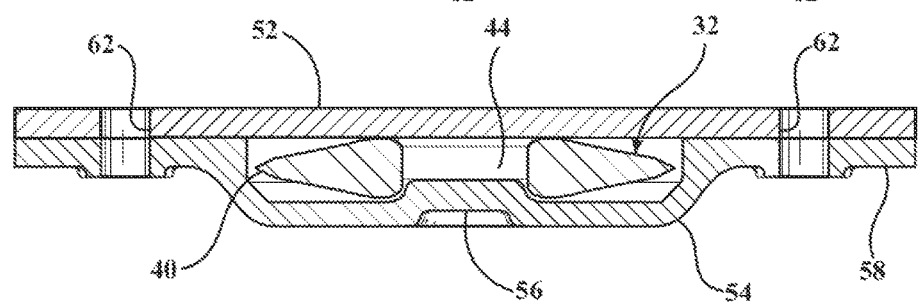
FIG. 6 is cross-sectional view taken generally through lines 6-6 of FIG. 5.

FIGS. 4-6 illustrate the knife blade 32 and sheath 34 in greater detail. As perhaps best shown in FIG. 4, the knife blade 32 includes a edged section 40 extending below the tang 36. The edged section 40 may be single or double edged, or merely pointed as with an icepick configuration. In the preferred embodiment illustrated in the Figures, the edged section 40 comprises double-edge forms and terminating at a point 42. A transverse hole 44 is formed in the edged section 40. Practice knife blades 32 are contemplated in which the double-edge forms and the point 42 are sufficiently blunted for training purposes. The tang 36 thus extends upwardly from the edged section 40 opposite the point 42. In the illustrated embodiments, the tang 36 has a generally rectangular cross-section terminating in a top end 46. At least one notch 48 is disposed in the tang 36, and in the illustrated embodiments a pair of notches 48 are employed. The notches 48 may be variously configured, but are here shown cut into the short sides of the rectangular tang 36 in the form of small grooves.

The sheath 34 is configured with a mouth opening 50 to receive the edged section 40 of the knife blade 32 with its tang 36 at least partially exposed as depicted in FIG. 5. That is, the tang 36 of the knife blade 32 preferably extends upwardly in exposed fashion from the mouth opening 50 of the sheath 34. While many designs of the sheath 34 are certainly possible, the illustrated embodiments include the sheath 34 being formed between inner 52 and outer 54 covers made of plastic (e.g., Kydex®), stiff leather or other suitable material. At least one of the inner 52 and outer 54 covers may include a detent 56 configured to engage with the transverse hole 44 in the knife blade 32. As shown in FIG. 5, the detent 56 may be integrally formed with the outer cover 54 in cases where its material properties possess sufficient flexibility and abrasion resistance. When the knife blade 32 is inserted into the sheath 34, the edged section 40 pushes past the detent 56 like a wedge flexing the outer cover 54 until the transverse hole 44 registers with the detent 56. The outer cover 54 then elastically returns to its natural shape and seats the detent 56 in the transverse hole 44 as shown in FIG. 6. This effectively locks the knife blade 32 in the sheath 34 so that under normal circumstances the cutting edges of the knife blade 32 remains securely encased in the sheath 34 as depicted in FIG. 5.

The sheath 34 preferably includes a mounting flange 58 or other type body fixture feature such as a belt clip or Velcro® or the like. In the illustrated embodiment, a plurality of attachment slots 60 and holes 62 are disposed in the mounting flange 58. The attachment slots 60 may be formed at various skewed angles relative to one another for convenient connection via a standard tactical belt or garment (e.g., MOLE and ALICE platforms).

When the ammunition magazine 28 is removed from its mag well in a semi-automatic handgun 26, the coupled knife assembly can be held by a user 20 as a stand-alone knife tool. FIG. 7 shows a hand 22 of the user 20 grasping the magazine 28 so that its dock 30 is closest to the user's thumb and forefinger, i.e., in a basic forward knife grip. The dock 30 may be configured with a recess in the form of a thumb rise 64 and an extension in the form of a finger guard 66. Together, the thumb rise 64 and finger guard 66 protect the user's hand 22 when handing the knife assembly in this stand-alone fashion. When the user places their thumb into the thumb rise 64, as shown, a traditional comfortable saber-type forward knife grip is assumed. Of course, the variations of forward and reverse knife grips are possible when the knife assembly is used in this stand-alone fashion. It should also be noted that the finger guard 66 is ergonomically designed so that when connected to a pistol 26 the user's little finger(s) are comfortably supported on the handgrip 24. See for example FIG. 3.

Ammunition magazines 28 like that shown in FIG. 8 commonly include a spring lock plate 68. The spring lock plate 68 closes the bottom of the hollow magazine 28 and is pressed in place by an internal coil or compression spring 70 inside the magazine 28. The spring lock plate 68 may include a downwardly extending tooth 72. The tooth 72 is often merely a bent tab-like feature that acts as a barb to retain an Original Equipment (OE) pommel (not shown) in place on the bottom of the magazine 28. An exemplary OE pommel may be observed by reference to U.S. Pat. No. 4,592,160 in the name of Bross issued Jun. 3, 1986, the entire disclosure of which is hereby incorporated by reference. Typically, the magazine 28 will also include a pair of flanges 74 disposed on opposite sides of the spring lock plate 68. Of course, not all magazines 28 are constructed the same and some routine engineering adaptations may be needed for magazines 28 that are different than what is shown in the drawings.

Figure 11:
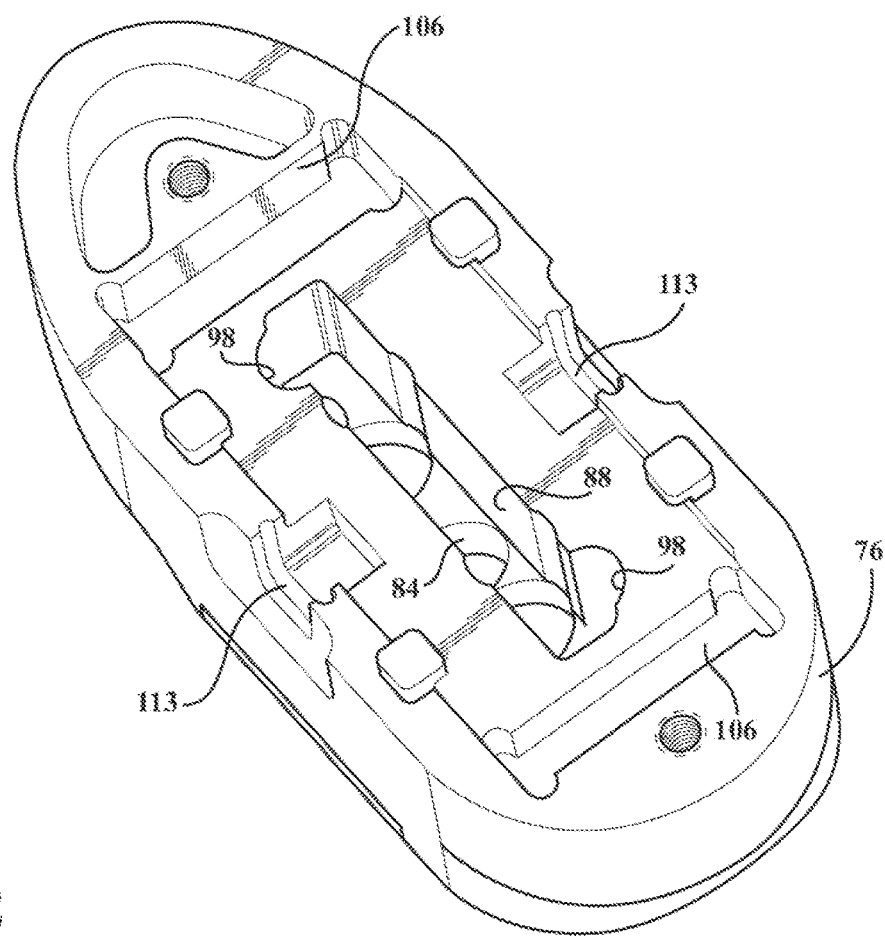
FIG. 11 is a perspective view showing the internal configuration of the upper body of the dock according to one embodiment of the invention.
Figure 12:
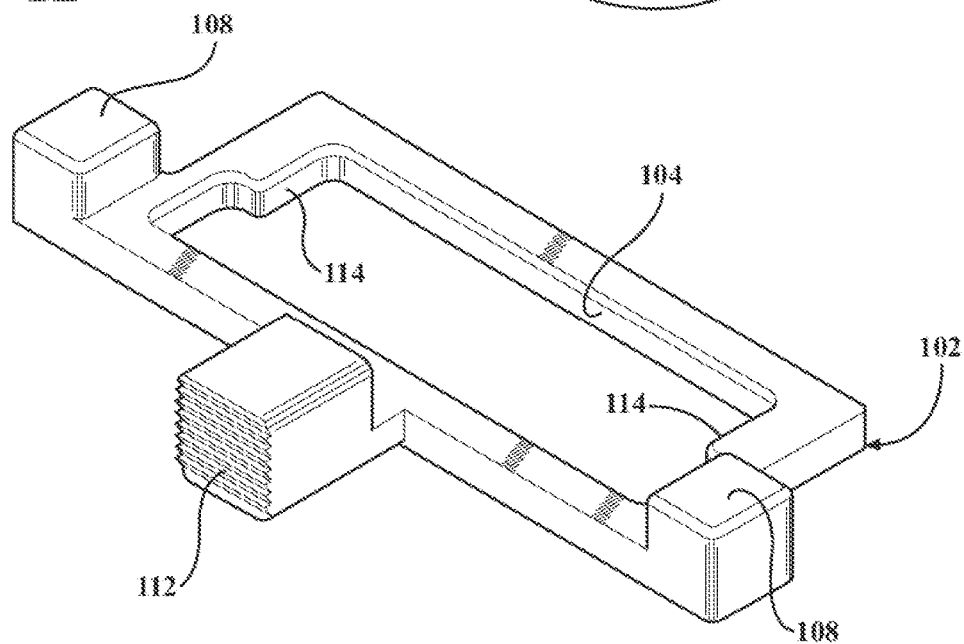
FIG. 12 is a perspective view of the lock switch.
Figure 13:
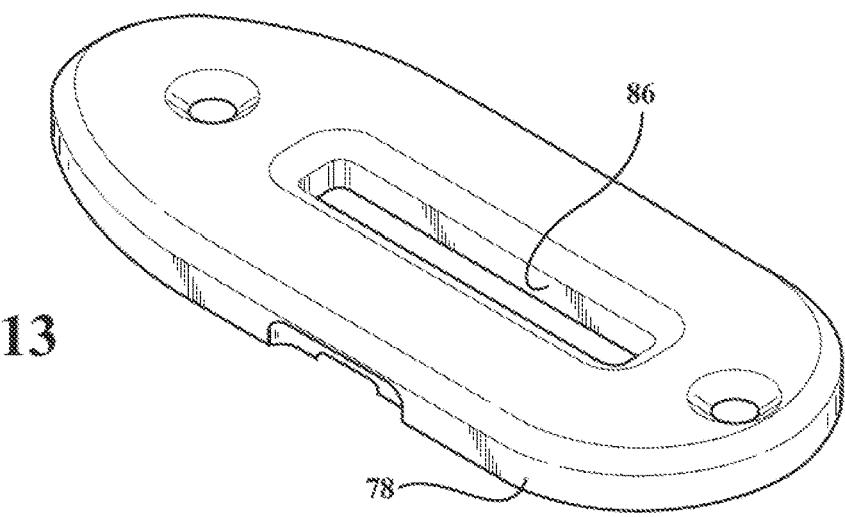
FIG. 13 is a perspective view of the bottom plate of the hilt.

The dock 30 is also shown in FIG. 8 including an upper body 76 and a bottom plate 78. Both members 76, 78 have the same profile with the bottom plate 78 configured to fully cover a lower-most side of the upper body 76. Detail views of the upper body 76 and bottom plate 78 are shown in FIGS. 11 and 13, respectively. A top socket 78 is formed on the upper body 76 with which to receive the bottom of the magazine 28. In particular, the top socket 78 includes a pair of channels 80 configured to interlock with the flanges 74 of the magazine 28 in a sliding motion. The top socket 80 also includes a pocket 84 configured to engage the tooth 72 of the spring lock plate 68 to fixedly lock the dock 30 to the magazine 28. In other words, in order to fit the dock 30 to a common, commercially available magazine 28, its OE pommel must first be removed and then replaced with the dock 30 via the sliding interlock of flanges 74 and channels 82 after the fashion illustrated in FIG. 8. The barb-like tooth 72 engages in the pocket 84 to retain the dock 30 in position. As mentioned, for magazines 28 that are constructed without flanges 74 and or a tooth 72 some fairly routine engineering modifications will need to be made in order to establish a secure fit of the dock 30. Furthermore, firearms without a removable magazine 28, such as revolvers, can be accommodated via a suitable adapter attached to the butt of the grip that mimics the flanges 74 and tooth 72.

Figure 10A:
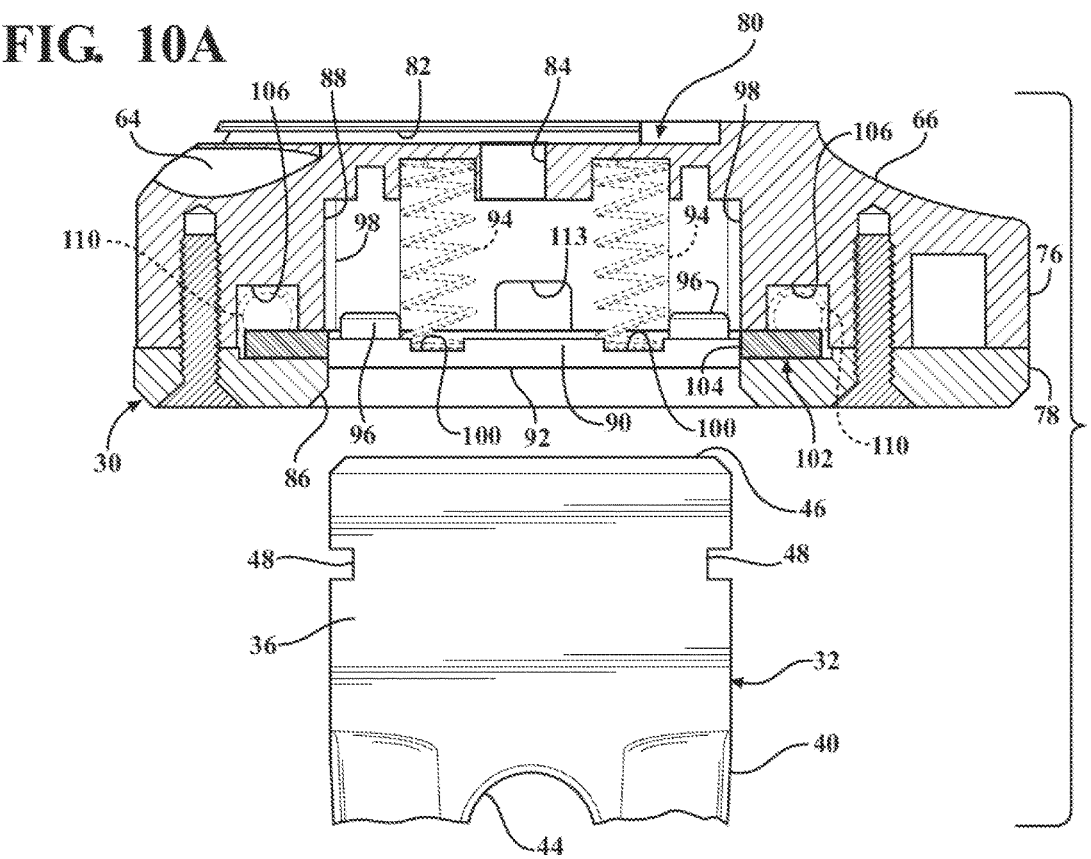
FIGS. 10A and 10B are time-sequence side views in cross-section showing internal core plug and lock switch components of the dock as the knife blade is inserted into the tang slot and locked in position.
Figure 10B:
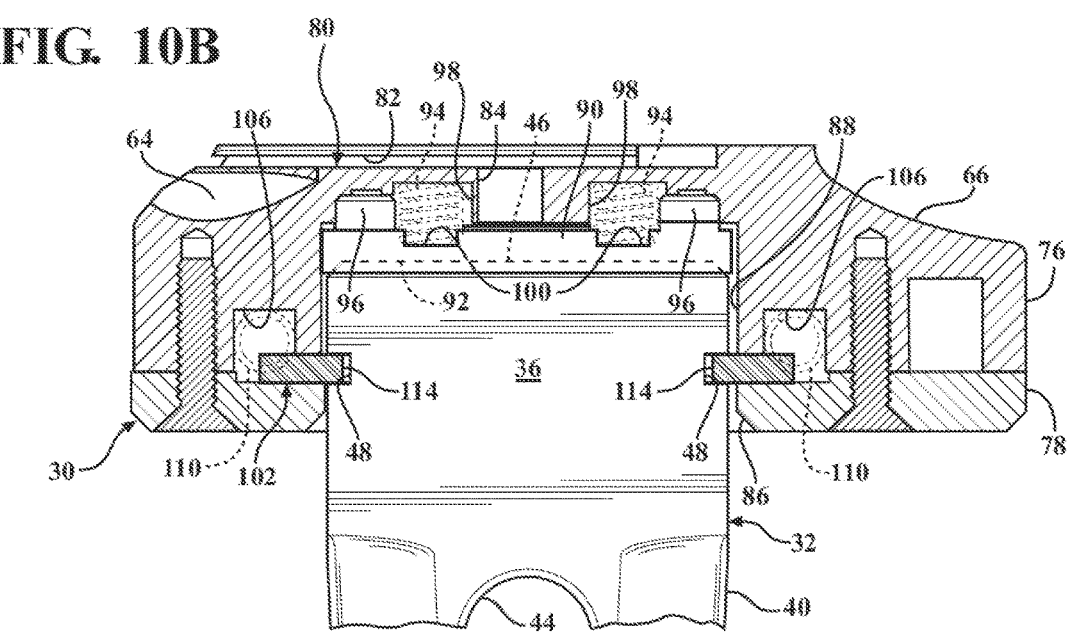

FIGS. 9A-10B illustrate the internal components in the dock 30 that function to automatically couple the knife blade 32 to the dock 30 so that in a surprise CQC or self-defense scenario the user 20 can at all times maintain a secure grip on the pistol 26 and keep it pointed toward the enemy. As mentioned earlier, in order to auto-couple the knife blade 32 to the dock 30, the user 20 moves the pistol 26 toward the knife blade 32 so that the dock 30 envelops its tang 36. More specifically, the bottom plate 78 is formed with an opening 86 that is aligned with a cavity-like tang slot 88 in the upper body 76. As shown in FIG. 13, the opening 86 is preferably surrounded by funnel-like tapers or generous chamfers that facilitate the coupling process. When the user 20 moves the pistol 26 onto the knife blade 32, the exposed tang 36 passes through the opening 86 and enters the tang slot 88. The opening 86 and tang slot 88 are both shaped to receive the rectangular tang 36 with an easy sliding fit but with relatively little free play so that the knife blade 32 is not perceived to wiggle when connected to the dock 30. FIGS. 9A and 10A show the tang 36 before it enters the tang slot 88, whereas FIGS. 9B and 10B shown the tang 36 fully seated in the tang slot 88 and locked in. It will be understood that the rectangular configuration of the tang slot 88, and the complimentary rectangular cross-section of the tang 36 represents an optional, albeit preferred, geometry. The only minor modifications, other geometries are certainly possible including but not limited to ovals, ellipses, circles and polygons (regular and irregular).

Figure 14:
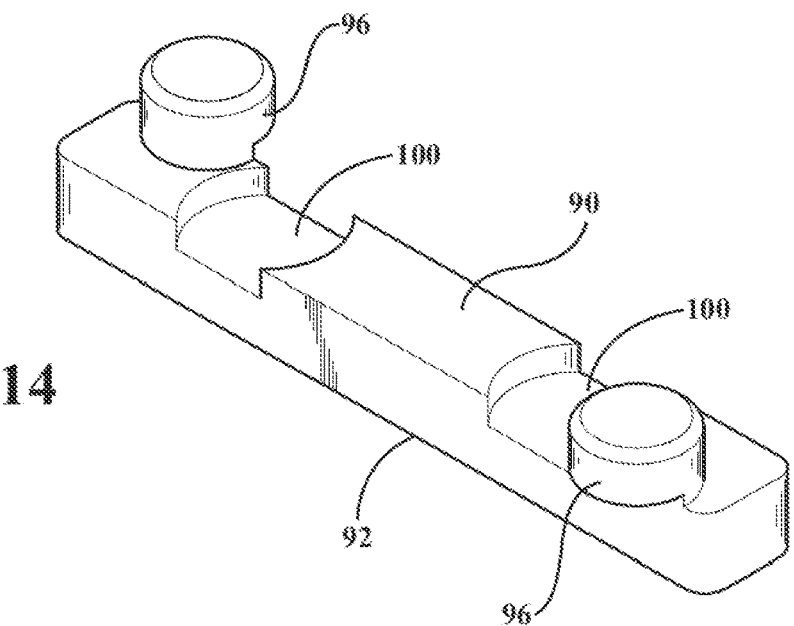
FIG. 14 is a perspective view of the core plug.
Figure 15:
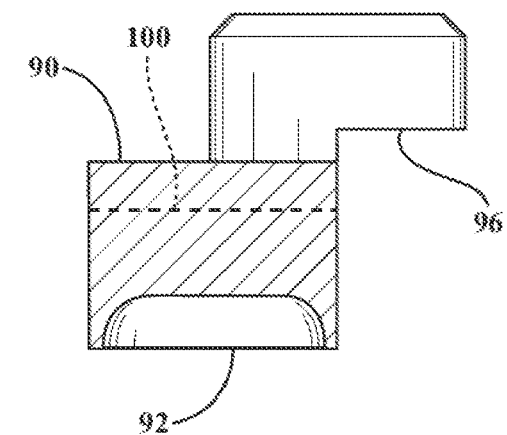
FIG. 15 is cross-sectional view taken along lines 15-15 of FIG. 14.

Referring still to FIGS. 9A-10B, a core plug 90 is slidably disposed in the tang slot 88. The core plug 90 has a peripheral shape that is generally equal to the peripheral shape of the tang 36 so that both slide with somewhat equal smoothness up and down in the tang slot 88. Detail views of the core plug 90 are shown in FIGS. 14 and 15. When the knife blade 32 is not coupled to the dock 30, a nose end 92 of the core plug 90 is located in the opening 86 (FIGS. 9A and 10A). In this position, the nose end 92 acts like a stopper to prevent debris from entering the tang slot 88. During the coupling process, the top end 46 of the tang 36 is guided into the opening 86 where it immediately encounters the nose end 92 of the core plug 90. As the tang 36 slides into the tang slot 88, the core plug 90 is pushed ahead and deeper into the tang slot 88. Perhaps best shown in FIG. 15, the nose end 92 is formed with a concavity that receives the chamfered or rounded top end 46 of the tang 36 in nested fashion. At least one core spring 94 is operatively disposed in bias against the core plug 90. In the illustrated embodiment, a pair of core springs 94 are operatively disposed in the tang slot 88 and biased against the core plug 90 so that whenever the tang 36 is in the tang slot 88, its top end 46 is seated with pressing engagement in the concavity of the nose end 92. The core plug 90 preferably includes at least one, and in the illustrated case a pair, of stop tabs 96. The stop tabs 96 ride up and down in tab tracks 98 formed in the upper body 76. (See FIG. 11.) The stop tabs 96 position the nose end 92 of the core plug 90 flush with or slightly recessed at the opening 86. The stop tabs 96 and tab tracks 98 are configured to be non-polar, meaning that the core plug 90 does not have a particular required orientation in the upper body 76 so long as the nose end 92 points down (i.e., is exposed thorough the opening 86). Spring seats 100 may be formed in the core plug 90 to help maintain position of the core springs 94.

A lock switch 102, generally indicated at 102, is operatively disposed between the dock 30 and the knife blade 32 for selective movement between locked and unlocked positions. In the locked position (FIGS. 9B and 10B), the lock switch 102 holds the tang 36 securely in the tang slot 88. In the unlocked position (FIGS. 9A and 10A), the lock switch 102 permits disconnection of the knife blade 32 from the dock 30. The lock switch 102 can be located on the knife blade 32, as in a self-locking spring clip, but in the illustrated embodiment is incorporated into the dock 30 and engageable with the tang 36 of the knife blade 32 in the locked position to hold the tang 36 securely in the tang slot 88. A detail view of the lock switch 102 is provided in FIG. 12.

The lock switch 102 may of course take many different configurations without departing from the spirit of this invention. In the illustrated embodiment, the lock switch 102 is formed as a generally rectangular body having an open inner region 104 generally surrounding the tang slot 88. In embodiments where the cross-sectional shape of the tang 36 is other than rectangular, it may be desirable to modify the shape of the lock switch 102, and in particular its open inner region 104 accordingly. The lock switch is supported on slide tracks 106 within the upper body 76 for movement transverse to the path of the tang slot 88. In other words, if the tang slot 88 is considered to have an up-down sliding path (for the tang 36), then the lock switch 102 has an intersecting left-right slide path in the upper body 76. When the tang 36 of the knife blade 32 is locked in the tang slot 88, the open inner region 104 of the lock switch 102 surrounds the tang 36. Runners 108 may be disposed on the side edges of the lock switch 102 for sliding movement within the slide tracks 106 to help maintain controlled linear motion as the lock switch 102 slide back-and-forth. At least one lock spring 110 is disposed in bias against the lock switch 102. In the illustrated embodiment, a pair of compression-type lock springs 110 are disposed in the slide tracks 106 and push directly against the two runners 108.

A push button 112 extends from the lock switch 102 and is adapted to protrude through a hole 113 in the sidewall of the dock 30 for convenient access by the user 20. When the user presses on the push button 112, the lock switch 102 slides in the slide tracks 106 and compresses or loads the lock springs 110. Such pushing action causes the lock switch 102 to move from its locked to its unlocked position. A tang 36 of a knife blade 32, or other implement/attachment/ accessory tool depending on application, can be removed from the tang slot 88 when the lock switch 102 is moved (by pressing the push button 112) to the unlocked position. Then, as the tang is withdrawn, the core springs 94 push on the core plug 90 to follow immediately behind. In fact, the pressure of the core springs 94 actually assists with a light pushing action to eject the knife blade 32, or other accessory tool. When held horizontally, the unrestrained knife blade 32 may be seen to project about one to twelve inches from the dock 30, depending on the strength of the core springs 94. Because the core plug 90 has a peripheral shape that is generally equal to the peripheral shape of the tang 36 (see for example FIG. 9B), the nose end 92 of the core plug 90 follows the tang 36 as it passes through the lock switch 102 and into the opening 86 in the bottom plate 76. The tang 36 is withdrawn completely from the dock 30, but the core plug 90 is arrested by one or both of the stop tabs 96 abutting the top surface of the lock switch 102 (see FIGS. 9A and 10A). When the one or both stop tabs 96 engage the top surface of the lock switch 102, the nose end 92 of the core plug 90 resides slightly inset from the opening 86 as best seen in FIG. 10A. In this arrested position, the core plug 90 resides within the open inner region 104 of the lock switch 102 holding it in its unlocked position. That is to say, as the knife blade 32 is uncoupled from the dock 30, the core plug 90 automatically inserts itself into the lock switch 102. The core plug 90 thus effectively jams itself in the open inner region 104 of the lock switch 102, holding the lock springs 110 compressed, and continues to restrain the lock switch 102 in this unlocked condition until the tang 36 is re-inserted.

When a tang 36 is reinserted through the opening 86, its top end 46 pushes the core plug 90 deeper into the tang slot 88 and against the bias of the core springs 94. The core plug 90 pushes up through the open inner region 104 of the lock switch 102 and tang 36 follows immediately behind in a smooth continuous motion. When the notches 48 in the tang 36 align with the lock plate 102, the lock switch 102 is free to slide (under the influence of the lock springs 110) to its locked position. This action is depicted in FIGS. 9B and 10B. The lock switch 102 includes at least one, but preferably two, bolts 114 that engage with the respective notches 48 to secure the tang 36 in the tang slot 88. In the illustrated embodiment, the bolts 114 comprise inset formations within the open inner region 104, which are perhaps best shown in FIG. 12. Naturally, many other mechanical equivalents for the lock switch 102 and cooperating elements can be envisioned by the person of ordinary skill in this field.

Preferably, the lock switch components and the dock 30 are designed to be fully reversible to suit left and right-handed users. In particular, the dock 30 is formed with holes 113 for the push button 112 on both sides as shown in FIG. 11. The user 20 can position the push button 112 on either left or right side of the dock 30 to best suit their preference. Whichever hole 113 is not used can be filled with a small, flat generally square side plug 115 like that visible in FIG. 9A. The side plug 115 is trapped between the upper body 76 and bottom plate 78 at the time of assembly.

Figure 16:
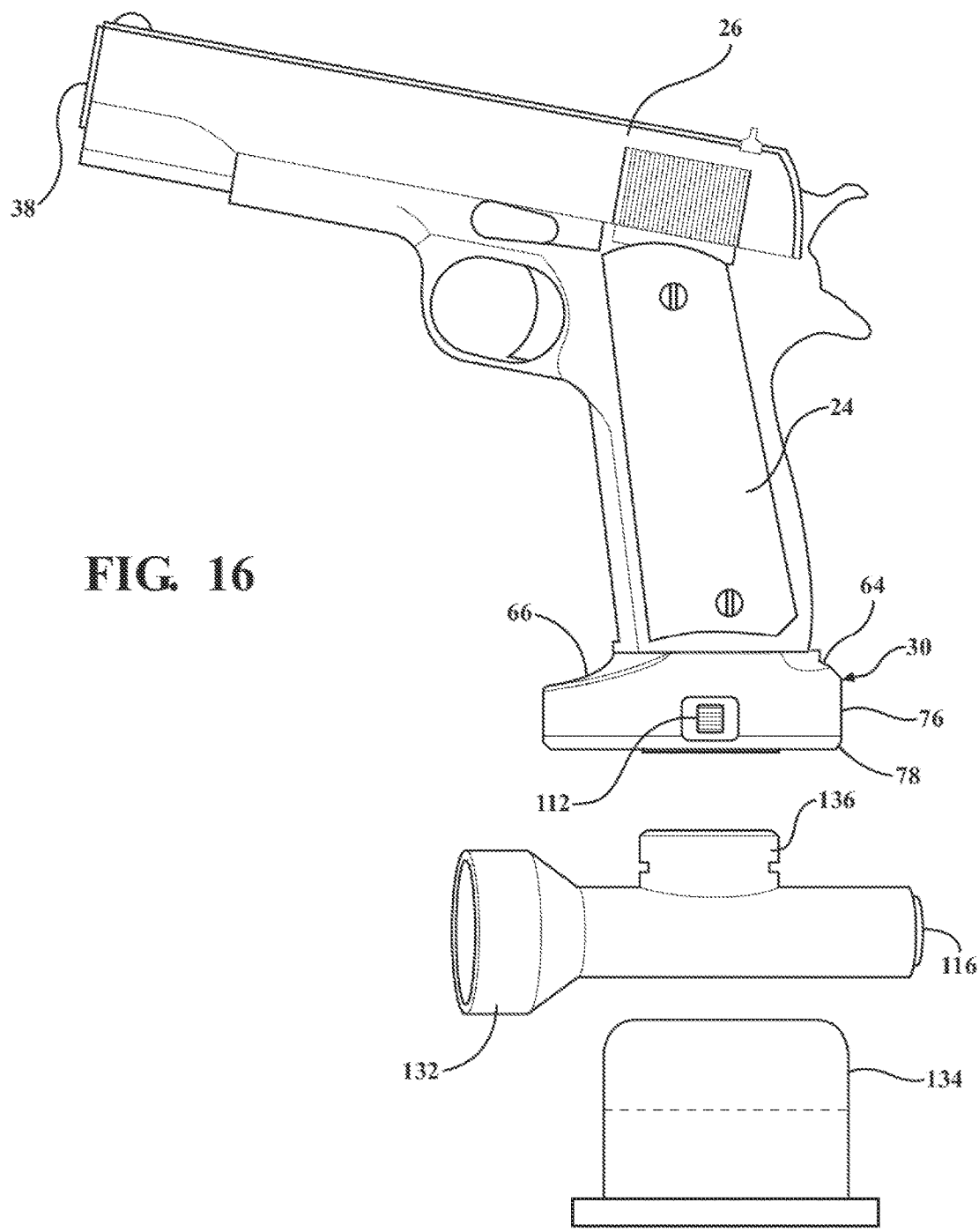
FIG. 16 is an exploded view showing an alternative embodiment of the invention wherein a flashlight (representing any type of tool) is fitted with a tang for auto-connection to the dock instead of a knife blade.

FIG. 16 depicts an alternative embodiment of the present invention wherein the same dock 30 is used, but the knife blade 32 is substituted by a flashlight 132 (or other accessory tool). The flashlight 132 fitted with a tang 136 for auto-connection to the dock 30 in exactly the same manner described above. Also, the sheath 34 of the preceding embodiment is replaced with a carrier 134 configured to securely hold the flashlight 132 with a snug friction fit. The flashlight 132 may include an on-off switch 116 which is actuated either manually or automatically with the flashlight is removed from the carrier 134. In the latter case for example, the on-off switch 116 could be configured to be automatically activated upon disconnection from the carrier 134. In this manner, the flashlight 132 will automatically turn "on" the moment it is removed from its carrier 134. Of course, other accessory tools and utility implements, e.g., a glass-breaker, training aides, firearm accessories and the like could be substituted for the flashlight 132 with only minor reconfiguration.

Figure 17:
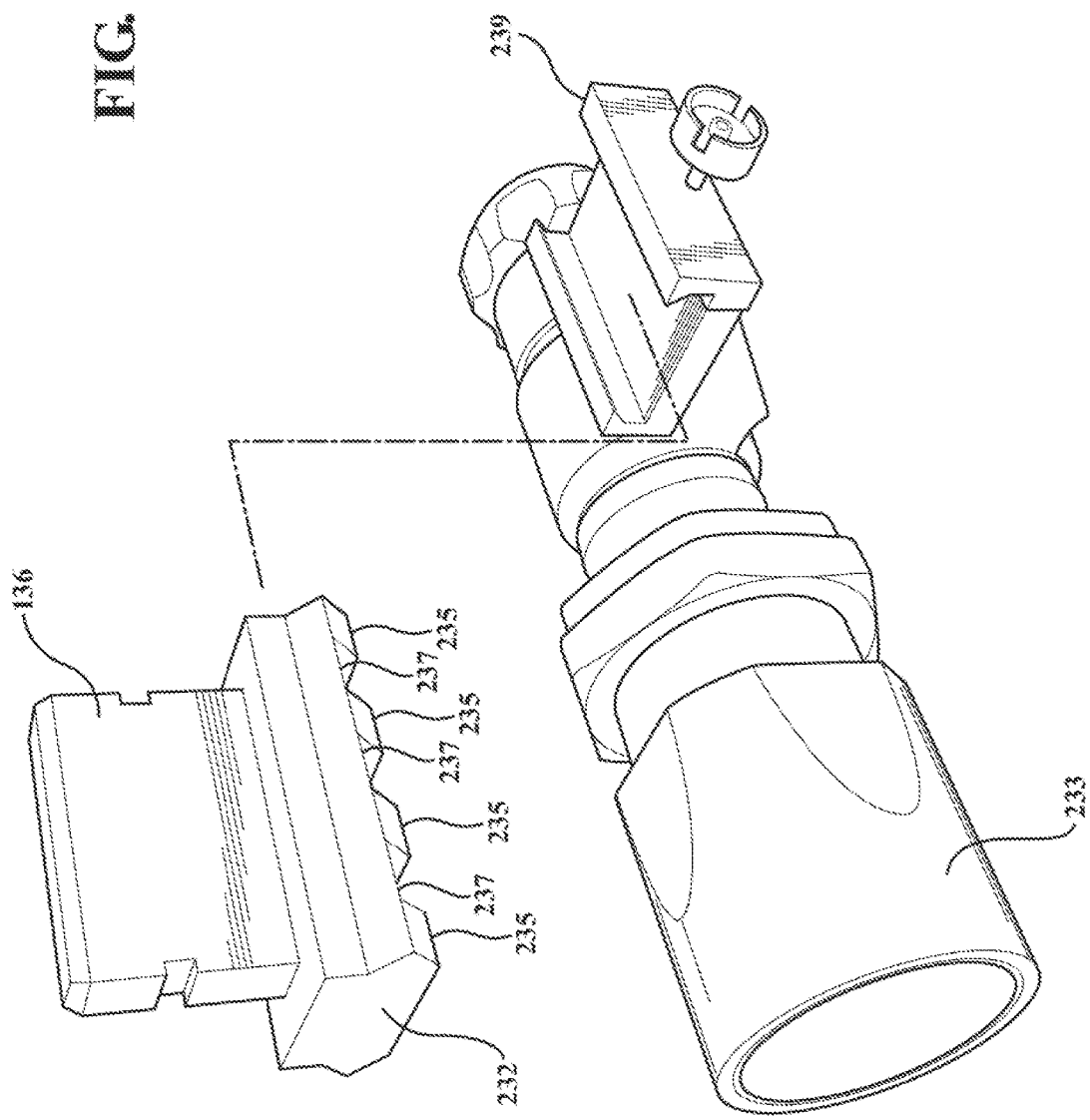
FIG. 17 is a simplified perspective view of yet another alternative embodiment wherein a universal mounting rail is fitted with a tang for auto-connection to the hilt, it being understood that the universal mounting rail can then serve as an interface to many differ tool types.

FIG. 17 is a simplified perspective view of yet another alternative embodiment wherein a universal mounting rail 232 is fitted with a tang 236 for auto-connection to the dock 30. The universal mounting rail 232 is a short segment of a bracket that provides a mounting platform for accessory tools and attachments of all kinds. The accessory tool (shown here as a flashlight 233) is coupled to the tang 236 via the universal mounting rail 232. In other words, the universal mounting rail 232 serves as a convenient interface between the tang 236 and virtually any accessory tool of choice. The universal mounting rail 232 is preferably of a standardized size, such as the common Picatinny rail, MIL-STD-1913 rail, STANAG 2324 rail, NATO Accessory Rail (or NAR), STANAG 4694, Weaver rail mount or the like. The universal mounting rail 232 consists of a series of ridges 235 with a T-shaped cross-section interspersed with flat spacing slots 237. Accessories (in this example a flashlight 233) are mounted either by sliding them on the universal mounting rail 232 from one end, by means of a Weaver-type mount 239 which is clamped to the rail, or onto the slots 237 between the raised sections.

In use, a user 20 holding a pistol 26 fitted with a dock 30 according to this invention is able to quickly engage the accessory tool 233 to the pistol 26 without use of the other hand and without removing his/her grip from the pistol handle 24. In one smooth straight-line motion, without ever losing a firm grip on the pistol 26, the user 20 is able to attach and withdraw the accessory tool 233 from its carrier. With practice, this maneuver can be accomplished without looking and in low-light conditions for tactical and self-defense situations.

In the illustrated example of FIG. 17, attention is drawn to the use of a side-mount style fixture 239 for the flashlight 233 which will enable a convenient lateral offset to the flashlight 233 which will closely approximate a traditional Harries Hold (also known as the Harries Technique). The Harries Hold is favored by many as its offset flashlight location draws enemy fire off to one side of the user 20. Thus, use of the universal mounting rail 232 in combination with a side-mount style fixture 239 and flashlight 233 will provide the defensive benefits of the Harries Hold in combination with a two-handed pistol grip which is not possible with a traditional Harries Hold. Common accessory tools may include tactical lights like that shown at 233, laser aiming modules, bladed tools, glass breaker spikes, and the like. A carrier (not shown) will be configured for the particular size and type of accessory tool that the user 20 chooses to attach to the universal mounting rail 232.

As suggested above, the top socket 80 may be modified to fit other applications. One such contemplated modification is to configure the top socket with Weaver-type mount or other fixture style that will connect the dock 30 (or a suitably modified form of the dock 30) to a standardized universal mounting rail like a Picatinny rail, NATO Accessory Rail, Weaver rail or the like. When the top socket is so modified (not shown), the dock 30 (or a suitably modified form of the dock 30) can be attached to any rail system for use in long-gun applications as well as handgun applications and indeed wherever universal mounting rails are found. In yet another contemplated variation, the top socket can be modified to fit the pommel of a pistol grip fitted to a long gun so that tactical accessories can likewise be attached for convenient use. Additional contemplated modifications to the top socket are described below.

Figure 18:
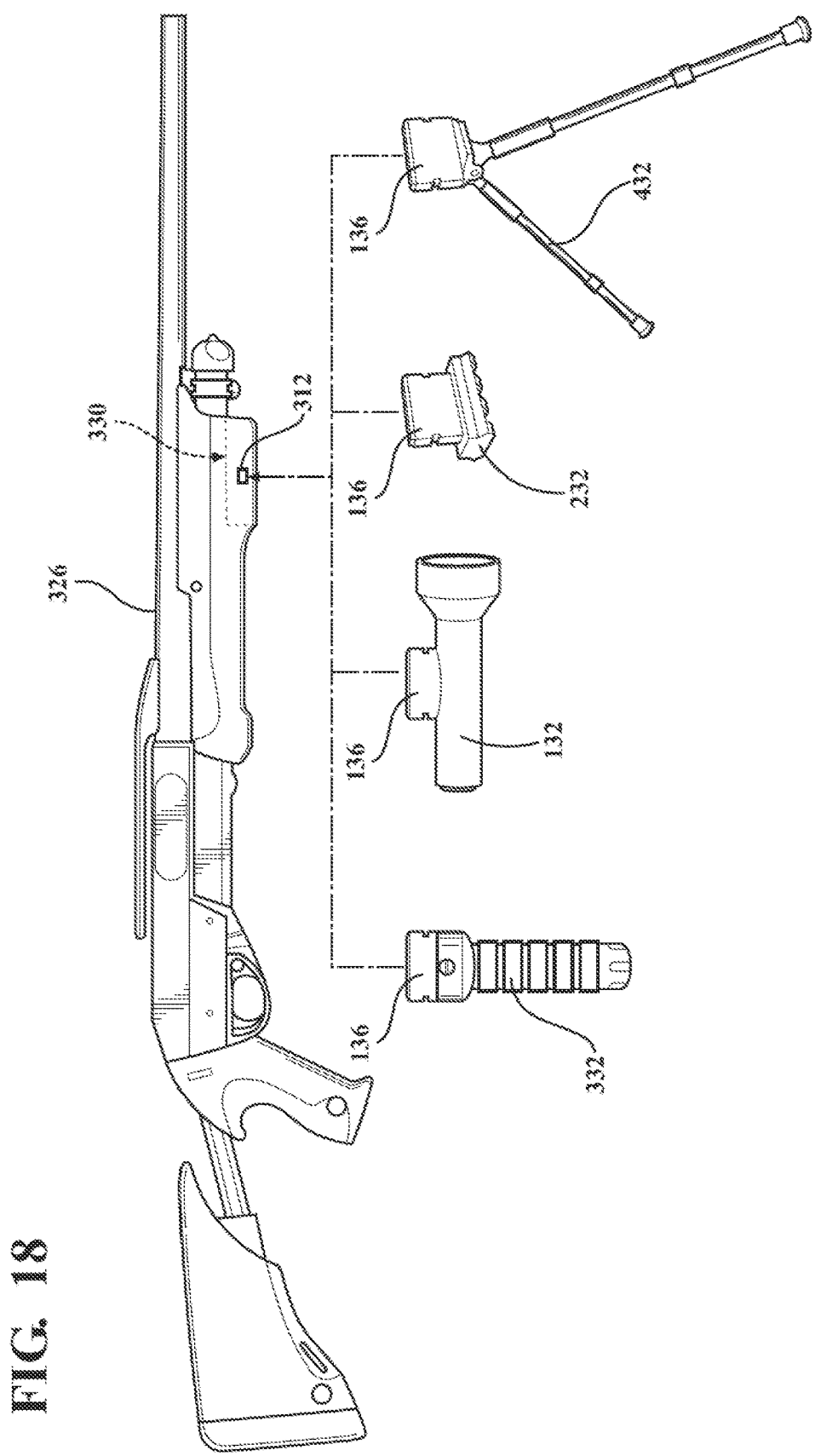
FIG. 18 is a further embodiment of the present invention wherein the dock is integrated into the fore-end of a long-gun, and showing multiple alternative accessory types each fitted with a tang for quick coupling to the integrated dock.

The straight-line coupling motion of an accessory tool to its supporting structure that is enabled by the present invention has benefits for other firearm applications. For instance, FIG. 18 illustrates a further variation in which the dock 330 is integrated into the fore stock of a long gun 326. That is to say, in this example the dock 330 is securely embedded within the body of the front hand guard such as by overmolding, adhesive, mechanical fasteners, or the like. Only the tang slot and push button 312 are exposed on the front hand guard. In the front elevation view provided in FIG. 18, the tang slot is not visible because it is accessed from the bottom of the front hand guard. The push button 312 is visible in this view. Of course, the dock 330 could be configured so that the tang slot opens toward one side rather than from the bottom, and the push button 312 could be relocated to the other side (left hand) or the bottom of the handguard as well. While the illustration portrays the long gun 326 as a tactical shotgun, it will be understood that the dock 330 could be integrated in this manner into to fore end grip/guard for any type of tactical rifle (e.g., AR and AK platforms), sporting rifle, hunting rifle, or any other type firearm. Furthermore, the location of the integrated dock 330 is not limited to the fore stock. With equal effectiveness, the dock 330 could be integrated to any suitable location in the shoulder stock, in the pistol grip, or other strategic locations. In this manner, any accessory tool can be coupled to the long gun 326 via the dock 330. The types of accessory tools may include a variety of objects, such as a vertical grip 332, a flashlight 132 (as in FIG. 16), a universal mounting rail 232 (as in FIG. 17) and a bipod 432. Of course, many other types of accessory tools are possible. In each case, however, the accessory tool (or its carrier) includes a tang 136 as in FIGS. 16 and 17 for engagement with the dock 330 in the manner described above. Furthermore, the long gun 326 is but one example of a support structure into which the dock 330 may be integrated. Other support structure examples include, but are by no means limited to, bags, packs, belts, holsters, equipment lockers, sporting goods, archery equipment, vehicles and other forms of equipment and apparel. For example, the dock 330 could be integrated into or attached to the limb of bow and there serve as a quick-mounting feature for a quiver or other accessory.

Furthermore, the straight-line coupling motion of an accessory tool to its supporting structure enabled by the present invention has many applications outside of firearms, particularly for applications within the tactical arts/endeavors in which an accessory tool must be very quickly and securely attached for use. FIGS. 19 and 20 depict yet two more embodiments of the dock 530, 630, respectively, which are adapted to be attached to a support structure in the form of a tactical helmet 526 (FIG. 19) and a tactical vest 626 (FIG. 20). Of course, the helmet 526 and vest 626 are but two examples of support structure to which the dock 530, 630 may be attached. Other support structure examples include but are not limited to pants, shirts, jackets, boots, bags, packs, belts, duty belt clips, holsters, and other forms of equipment and apparel.

As shown in FIG. 19, the top socket region of the dock 530 may be configured with straps, loops, clamps or other fastening elements to make a secure connection to the helmet 526. The dock 530 can be attached to the helmet 526 at its front to connect tactical accessory tools like night vision goggles 532. Or the dock 530 can be attached to the side of the helmet 526 to connect a flashlight 132 or a universal mounting rail 232. These are merely examples of the many possibilities. The tang slots 588 in each dock 530 are oriented horizontally in this example, however vertical and angular orientations are certainly possible. Indeed, many variations and alternatives are possible, both in terms of attachment locations for the dock 530 as well as for the types of accessory tools that can be connected via the dock 530. The push button 512 of each dock 530 is shown on the top side, however the user may prefer to orient a dock 530 so that its push button 512 is located on the bottom or to the right or left side.

In FIG. 20, the top socket region of the dock 630 is configured to couple to the standardized attachment protocols for a tactical (e.g., MOLLE) vest 626. These attachment protocols may be common across a wide spectrum of tactical gear. In FIG. 20, one dock 630 is shown attached to the front of the vest 626 and oriented so that its tang slot 688 is horizontal. A second dock 630 is attached to the side of the vest 626 and oriented so that its tang slot 688 is vertical. Tactical accessory tools in this example include a pistol holster 632, a flashlight carrier 732, a utility carrier 832, a universal mounting rail 232 (as in FIG. 17), and a knife sheath/scabbard 932. As stated previously, many different types of accessory tools can be accommodated in the present invention simply by attaching a tang 136. The docks 630 can also be oriented so as to locate the push buttons 612 for ease of access by the user.

Indeed, the straight-line coupling motion of an accessory tool to its supporting structure enabled by the present invention has many applications in non-tactical environments, including service work, mechanics, outdoor activities and hobbies. A user may wish to outfit an equipment locker (not shown) or other type of storage area with a bank of docks 530, 630 to securely hold each accessory tool (fitted with a tang 132) when not in use. Similarly, a utility vehicle (such as a police car or fire truck or farm truck or service-repair truck) may wish to install a bank of docks 530, 630 to organize accessory tools during transport. In these examples, it is contemplated that a user will be either wearing or carrying the support structure to which at least one dock is attached or integrated. When needed, the user conveniently selects the desired accessory tool(s) from the storage bank and connects the accessory tool(s) to the dock(s). In reverse order, the accessory tool(s) can be quickly disconnected from the supporting structure (e.g., firearm, tactical gear, etc.) and stored when not in use. In another contemplated example, an archery hunter may have a dock 330, 530, 630 attached to his/her bow for coupling an arrow quiver. When the hunter arrives in their hunting stand (often high in a tree), they may wish to have a secondary dock 530, 630 conveniently located to which they can hang the quiver while waiting for an animal to appear. In like manner, a hunter may wish to stow other "docked" accessory tools carried to a hunting stand. When needed, the hunter can quickly connect the stowed accessory tool and re-attach to the dock 330, 530, 630 that is carried on their body or their equipment (e.g., hunting bow or rifle 326).

In this manner, the coupling system of this invention enables the rapid attachment of any of a number of tactical or tool accessories. Moreover, the coupling system provides the ability to interchange accessory tools on the fly, which can be modified to fit or be integrated to the supporting structure (e.g., magazine base or grip of a pistol, the fore-end of a long gun) for use of the accessory tool, which use may be a tactical situation, a police or fireman situation, a hunting or outdoor situation, a service-repair situation, or any other lawful purpose. In all permutations, a tang 36, 136 is incorporated directly onto an accessory tool or to the carrier/holster for an accessory. The tang 36, 136 then slides into the complimentary tang slot of the dock where it is automatically secured for use by a spring-loaded lock switch 102. A core plug 90 in the tang slot holds the lock switch 102 in an unlocked position when the tang 36, 136 is uncoupled from the dock. As stated previously, the rectangular cross-section of the tang 36, 136 and its mating tang slot can be modified to a different geometry if desired.

In use, the accessory tool (be it a knife blade 32, a flashlight 132, a universal mounting rail 232, a bi-pod 432, etc.) may be stowed until needed, and at that time quickly and securely connected to the supporting structure (be it a pistol 26, a long gun 326, a helmet 526, a tactical vest 626, etc.). The exposed tang 36, 136 on each accessory tool slides into the tang slot in the dock, and upon reaching full depth automatically self-locks in place. To decouple the accessory tool from the dock, the user depresses the exposed push button, then manually separates the accessory tool from the supporting structure.

The present invention effectively accommodates blades 36 and other types of implements on the pistol grip of a handgun 26 in a convenient, ergonomic manner and which can be rapidly deployed in instances of sudden, extreme life-threatening action. Moreover, the present invention is able to quickly and securely couple accessory tools of all types to a supporting structure using a straight-line coupling motion. The invention represents a quick-change coupling system in which an accessory tool, such as a flashlight 132 for example, can be locked to a person quickly under high stress situations and just as quickly removed or relocated. The coupling system of this invention minimizes the need to carry redundant accessory tools, thereby reducing a person's overall weight burden and providing the opportunity to add or remove items on the fly, safely in high stress scenarios such as combat, such as to a duty or standard belt, a tactical vest 626, or even to a military/law enforcement tactical helmet 526.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A coupling assembly of the type for rapidly connecting and disconnecting an accessory tool to a support structure through a straight-line motion, said assembly comprising:
    a dock, said dock including a tang slot, a core plug slidably disposed in said tang slot, said core plug having a nose end, said tang slot configured to receive at least a portion of said nose end of said core plug, at least one core spring operatively disposed in bias against said core plug,
    an accessory tool, said accessory tool including a tang having a cross-section configured to fit matingly within said tang slot in said dock, said accessory tool including a notch disposed in said tang,
    a lock switch supported on said dock for selective movement between locked and unlocked positions, said lock switch engageable with said tang of said accessory tool in said locked position to hold said tang securely in said tang slot, and said lock switch disengageable from said tang of said accessory tool in said unlocked position to permit disconnection of said accessory tool from said dock, said lock switch having a bolt disposed in said notch of said tang when said lock switch is in said locked position, said lock switch has an open inner region generally surrounding said tang slot and moveable transversely relative thereto, said bolt comprising an inset formation within said open inner region.

2. The assembly of claim 1, wherein said lock switch has an open inner region generally surrounding said tang slot and moveable transversely relative thereto.

3. The assembly of claim 1, wherein said tang has a top end, said tang is disposed in said tang slot of said dock with said bolt disposed in said notch of said tang, and said nose end of said core plug disposed in pressing engagement against said top end of said tang.

4. The assembly of claim 3, wherein said nose end has a concavity formed therein, said top end of said tang seated within said concavity of said nose end.

5. The assembly of claim 1, wherein said lock switch has a push button adapted to extend through a sidewall of said dock.

6. The assembly of claim 1, wherein said dock includes at least one lock spring disposed to bias said lock switch toward said locked position.

7. The assembly of claim 1, wherein said tang slot has a generally rectangular shape opening, and said tang has a complimentary rectangular shape.

8. The assembly of claim 1, wherein said dock includes a bottom plate, said bottom plate including an opening aligned with said tang slot to receive said tang of said accessory tool, said tang slot configured to receive at least a portion of said nose end of said core plug when said accessory tool is disengaged therefrom and said lock switch is in said unlocked position.

9. The assembly of claim 1, wherein said core plug includes at least one stop tab, said dock including at least one stop tab track configured to slidably receive said stop tab.

10. The assembly of claim 1, wherein said dock includes a top socket configured to operatively engage a support structure.

11. The assembly of claim 10, wherein said dock includes and an upper body and a bottom plate, said top socket disposed on said upper body, said tang slot disposed within said upper body, said bottom plate including an opening aligned with said tang slot in said upper body to receive said tang of said accessory tool.

12. The assembly of claim 11, wherein said lock switch is disposed at least partially in said upper body, said lock switch having a push button adapted to extend transversely through a sidewall of said upper body.

13. The assembly of claim 12, wherein said upper body includes at least one slide track, said lock switch including at least one runner disposed for sliding movement within said slide track, at least one lock spring disposed in bias against said lock switch.

14. The assembly of claim 10, wherein said top socket includes a pair of channels configured to operatively engage complementary flanges on the butt-end of a pistol handgrip.

15. The assembly of claim 14, wherein said top socket includes a pocket configured to engage a tooth on the butt-end of a pistol handgrip.

16. A fore-grip guard for a rifle, said guard comprising:
a dock, said dock including an exposed tang slot, a core plug slidably disposed in said tang slot, said core plug having a nose end, said tang slot configured to receive at least a portion of said nose end of said core plug, at least one core spring operatively disposed in bias against said core plug,
an accessory tool, said accessory tool including a tang having a cross-section configured to fit within said tang slot in said dock, said tang having a top end, said tang disposed in said tang slot of said dock, said nose end of said core plug disposed in pressing engagement against said top end of said tang, said accessory tool including a notch disposed in said tang adjacent said top end,
a lock switch supported for movement between locked and unlocked positions, said lock switch engageable with said tang of said accessory tool in said locked position to hold said tang securely in said tang slot, and said lock switch disengageable from said tang of said accessory tool in said unlocked position to permit disconnection of said accessory tool from said dock, said lock switch having a bolt disposed in said notch of said tang when said lock switch is in said locked position, said lock switch has an open inner region generally surrounding said tang slot and moveable transversely relative thereto, said bolt comprising an inset formation within said open inner region.

17. The fore-grip guard of claim 16, wherein said accessory tool includes at least one notch disposed in said tang, said bolt disposed in said notch of said tang when said lock switch is in said locked position.

* * * * *